United States Patent
Tanaka et al.

(10) Patent No.: US 10,768,890 B2
(45) Date of Patent: Sep. 8, 2020

(54) AUDIO SYSTEM CONTROL METHOD, CONTROL TERMINAL DEVICE, AND INFORMATION STORAGE MEDIUM

(71) Applicant: YAMAHA CORPORATION, Hamamatsu-shi (JP)

(72) Inventors: Katsuaki Tanaka, Hamamatsu (JP); Tomoyoshi Akutagawa, Hamamatsu (JP); Hiroyuki Ichi, Hamamatsu (JP); Yuki Suemitsu, Hamamatsu (JP); Akihiko Suyama, Hamamatsu (JP); Kazuya Mushikabe, Hamamatsu (JP); Keisuke Tsukada, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 25 days.

(21) Appl. No.: 15/902,394

(22) Filed: Feb. 22, 2018

(65) Prior Publication Data

US 2018/0181369 A1    Jun. 28, 2018

Related U.S. Application Data

(63) Continuation of application No. PCT/JP2016/081883, filed on Oct. 27, 2016.

(30) Foreign Application Priority Data

Oct. 30, 2015    (JP) .................................. 2015-214390

(51) Int. Cl.
*G06F 3/16*    (2006.01)
*G06F 3/0482*    (2013.01)
(Continued)

(52) U.S. Cl.
CPC ............ *G06F 3/165* (2013.01); *G06F 3/0482* (2013.01); *G06F 3/0484* (2013.01); *H04S 7/302* (2013.01); *H04R 3/12* (2013.01); *H04R 2227/005* (2013.01)

(58) Field of Classification Search
CPC ...... G06F 3/0482; G06F 3/0484; G06F 3/165; H04R 3/12; H04S 7/00
See application file for complete search history.

(56) References Cited

U.S. PATENT DOCUMENTS

| 7,315,985 B1 * | 1/2008 | Gauvin | ................... H04L 41/12 715/734 |
| 2006/0094360 A1 * | 5/2006 | Jung | .................. H04L 12/2805 455/41.2 |

(Continued)

FOREIGN PATENT DOCUMENTS

| CN | 1770721 A | 5/2006 |
| CN | 103597858 A | 2/2014 |

(Continued)

OTHER PUBLICATIONS

International Search Report issued in International Application No. PCT/JP2016/081883 dated Dec. 20, 2016. English translation provided.

(Continued)

*Primary Examiner* — Jennifer N To
*Assistant Examiner* — Reji Kartholy
(74) *Attorney, Agent, or Firm* — Rossi, Kimms & McDowell LLP

(57) ABSTRACT

A list screen of a plurality of reproduction devices is displayed on a display unit based on relationship information between the plurality of reproduction devices which is connected via network. Selection of a reproduction device which is made to perform a content reproduction operation (Continued)

among the plurality of reproduction devices is received. A command is transmitted to the selected reproduction device.

14 Claims, 21 Drawing Sheets

(51) Int. Cl.
*G06F 3/0484* (2013.01)
*H04S 7/00* (2006.01)
*H04R 3/12* (2006.01)

(56) References Cited

U.S. PATENT DOCUMENTS

| | | | |
|---|---|---|---|
| 2006/0156115 A1* | 7/2006 | Kim | H04L 41/06 |
| | | | 714/724 |
| 2007/0183617 A1 | 8/2007 | Yokota | |
| 2008/0075295 A1 | 3/2008 | Mayman et al. | |
| 2009/0234478 A1 | 9/2009 | Muto et al. | |
| 2010/0299639 A1* | 11/2010 | Ramsay | G06F 3/0486 |
| | | | 715/835 |
| 2013/0080955 A1* | 3/2013 | Reimann | G06F 3/0486 |
| | | | 715/769 |
| 2013/0243199 A1 | 9/2013 | Kallai et al. | |
| 2013/0283161 A1 | 10/2013 | Reimann et al. | |
| 2013/0290888 A1 | 10/2013 | Reimann et al. | |
| 2014/0226834 A1* | 8/2014 | Kallai | H04R 27/00 |
| | | | 381/80 |
| 2015/0092947 A1* | 4/2015 | Gossain | G11B 27/002 |
| | | | 381/58 |
| 2015/0378559 A1 | 12/2015 | Reimann et al. | |
| 2015/0378568 A1 | 12/2015 | Reimann et al. | |
| 2015/0378588 A1 | 12/2015 | Reimann et al. | |
| 2016/0239167 A1 | 8/2016 | Reimann et al. | |
| 2016/0291925 A1 | 10/2016 | Kohara et al. | |

FOREIGN PATENT DOCUMENTS

| | | |
|---|---|---|
| CN | 203734828 U | 7/2014 |
| CN | 203840339 U | 9/2014 |
| CN | 104106036 A | 10/2014 |
| JP | 2009218937 A | 9/2009 |
| JP | 2009218939 A | 9/2009 |
| JP | 2014042286 A | 3/2014 |
| JP | 2014519726 A | 8/2014 |
| JP | 2015501561 A | 1/2015 |
| JP | 2015100085 A | 5/2015 |
| WO | 2012137190 A1 | 10/2012 |

OTHER PUBLICATIONS

Written Opinion issued in International Application No. PCT/JP2016/081883 dated Dec. 20, 2016.
English translation of Written Opinion issued in International Application No. PCT/JP2016/081883 dated Dec. 20, 2016, previously cited in IDS filed Feb. 22, 2018.
International Preliminary Report on Patentability issued in International Application No. PCT/JP2016/081883 dated May 11, 2018. English translation provided.
Office Action issued in Japanese Appln. No. 2015-214390 dated Feb. 26, 2019. English translation provided.
Extended European Search Report issued in European Appln. No. 16859895.1 dated May 24, 2019.
Office Action issued in Chinese Appln. No. 201680063368.X dated Nov. 25, 2019. English translation provided.

* cited by examiner

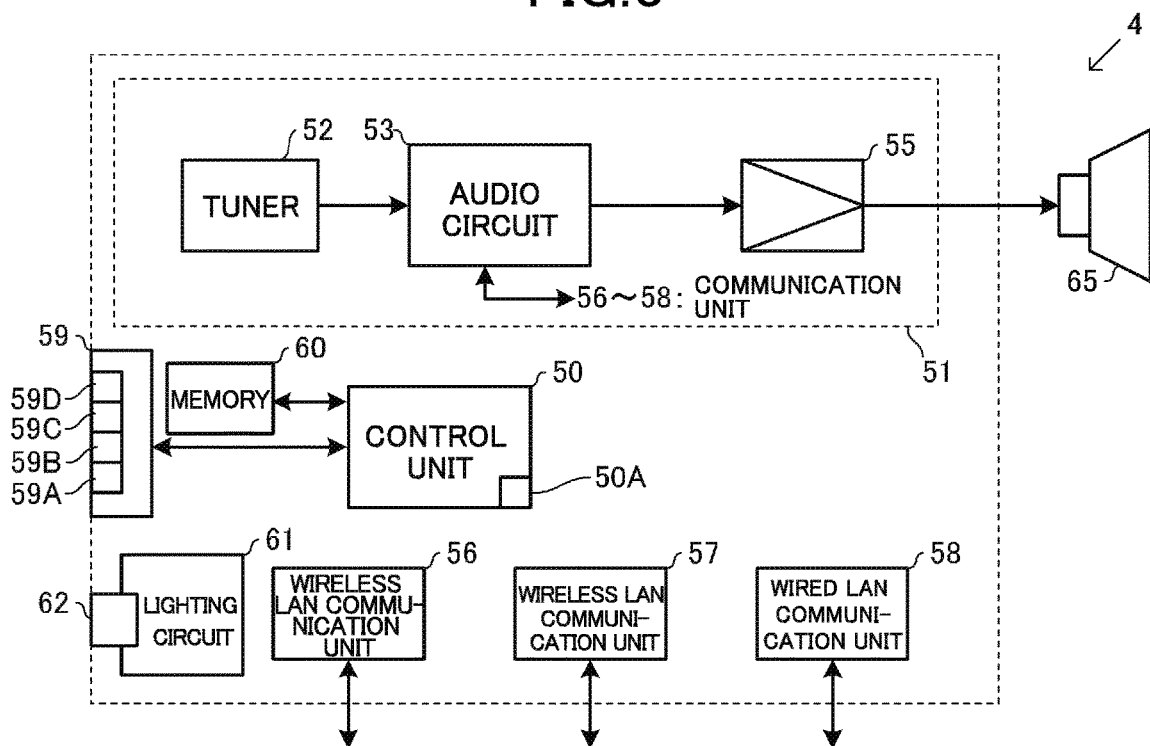

SYSTEM MANAGEMENT TABLE (DEVICE LIST AND AP LIST)

| DEVICE ID | MAC ADDRESS | IP Address | HOP NUMBER | AP ACTIVATION | CHILD NUMBER |
|---|---|---|---|---|---|
| 00 | xx-xx-xx-xx-xx-xx<br>yy-yy-yy-yy-yy-yy | 192.168.0.1<br>192.168.1.1 | 0(ROOT) | YES | 2 |
| 01 | xx-xx-xx-xx-xx-xx<br>yy-yy-yy-yy-yy-yy | 192.168.0.2<br>192.168.1.2 | 1(NODE) | YES | 1 |
| 02 | xx-xx-xx-xx-xx-xx<br>yy-yy-yy-yy-yy-yy | 192.168.0.3<br>192.168.1.3 | 1(NODE) | NO | 1 |
| 03 | xx-xx-xx-xx-xx-xx<br>yy-yy-yy-yy-yy-yy | 192.168.0.4<br>192.168.1.4 | 2(LEAF) | NO | 0 |
| | | | | | |
| 06 | xx-xx-xx-xx-xx-xx<br>yy-yy-yy-yy-yy-yy | 192.168.0.6<br>192.168.1.6 | 99(BRANCH) | NO | 0 |
| EXTERNAL ACCESS POINT INFORMATION | SSID | pass pharase | Security type | BSSID | |

FIG.5

AUDIO CONTROL TABLE

| DEVICE ID | IP Address | MODEL | INSTALLATION LOCATION (ROOM ID) | GROUPING | PAIRING | SERVICE | VARIOUS SETTING INFORMATION ITEMS |
|---|---|---|---|---|---|---|---|
| 00 | 192.168.0.1 | AV RECEIVER | Living room | 1A | – | Net DISTRIBUTION | *** |
| 01 | 192.168.0.2 | PLAYER A | Dining room | 1B | – | CD, Net DISTRIBUTION | *** |
| 02 | 192.168.0.3 | PLAYER B | Bed room | 1B | – | CD, Net DISTRIBUTION | *** |
| 03 | 192.168.0.4 | SPEAKER A | *** | – | (1, R, PARENT) | Net DISTRIBUTION RADIO | *** |
| 04 | 192.168.0.5 | SPEAKER B | *** | – | (1, L, CHILD) | Net DISTRIBUTION RADIO | *** |
| 06 | 192.168.0.6 | SPEAKER C | *** | – | – | *** | *** |

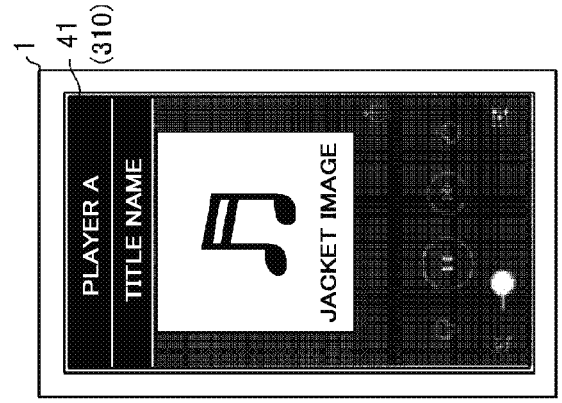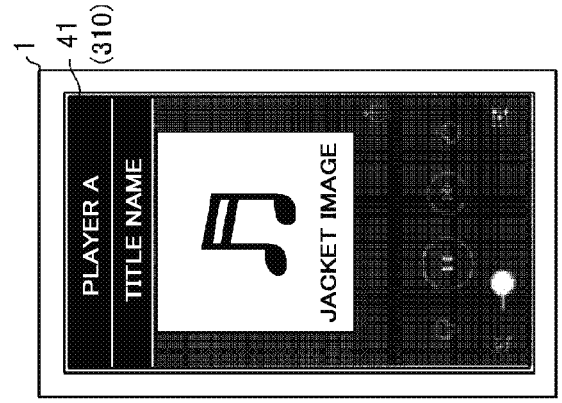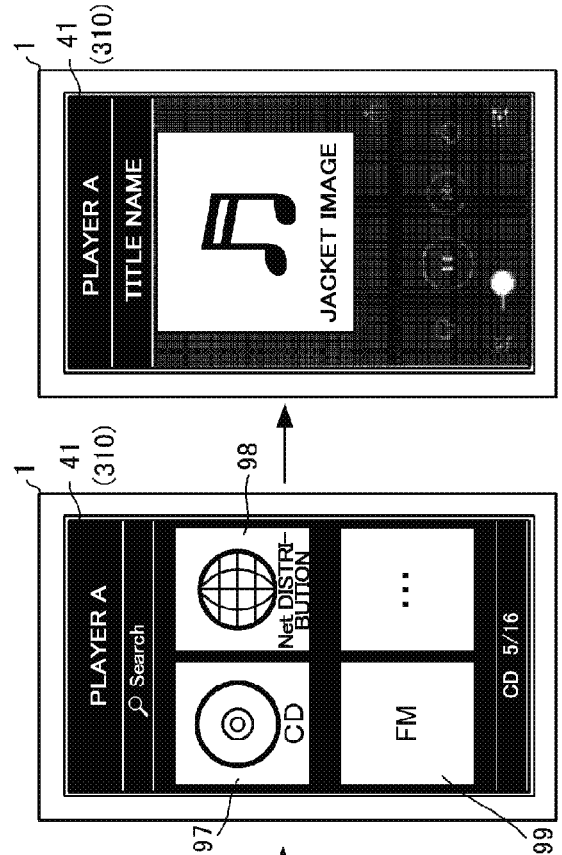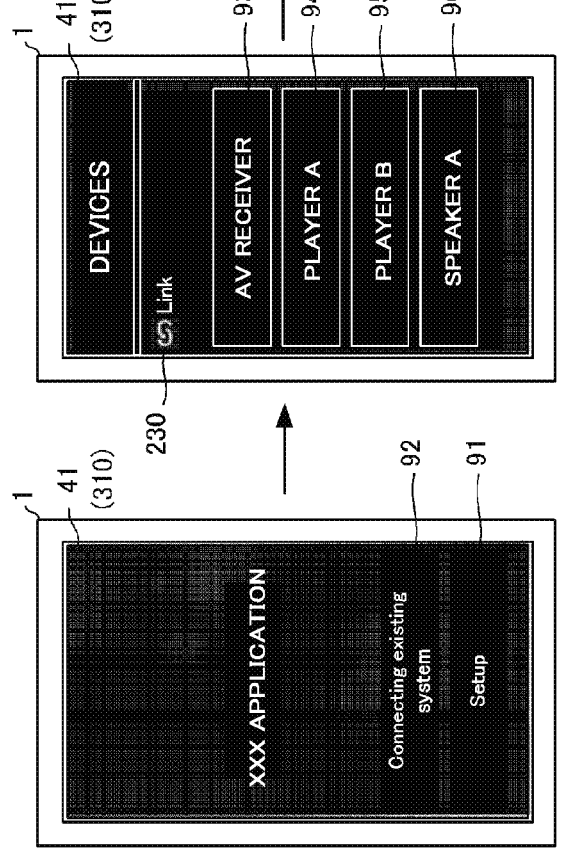

AUDIO SYSTEM CONTROL METHOD, CONTROL TERMINAL DEVICE, AND INFORMATION STORAGE MEDIUM

CROSS-REFERENCE TO RELATED APPLICATION

The present disclosure contains subject matter related to that disclosed in Japanese Patent Application JP2015-214390 filed in the Japan Patent Office on Oct. 30, 2015 and International Patent Application PCT/JP2016/081883 filed in the Japan Patent Office on Oct. 27, 2016, the entire contents of which are hereby incorporated by reference.

BACKGROUND OF THE INVENTION

Technical Field

The present invention relates to a control terminal device, an audio system control method, and an audio system control program for controlling content reproduction of a plurality of reproduction devices.

Background Art

There are audio systems where a plurality of reproduction devices such as audio devices disposed in each room such as a living room or a bedroom are connected to a network (home network) such as a LAN and control content reproduction or the like of each audio device is controlled using a mobile terminal device (for example, see JP 2015-100085 A). In the mobile terminal device, for example, a list screen of the audio devices is displayed, and a command such as content reproduction is transmitted to the audio device selected by a user from the list screen. In addition, the audio system described in JP 2015-100085 A has a configuration in which the user sets a synchronous reproduction group using the mobile terminal device and causes a plurality of audio devices belonging to the same group to perform synchronous reproduction of same content.

SUMMARY OF INVENTION

Technical Problem

In the audio system as described above, there is a demand to perform a display in accordance with a relationship between the audio devices on the list screen of the audio devices, in order to make it easy to select the audio device as a transmission destination of the command according to the relationship between the audio devices.

For example, in the audio system as described above, synchronous reproduction can be performed by a plurality of audio devices, but the sound reproduced and output by each audio device has become the same. For example, in a case of performing synchronous reproduction by a group to which two audio device belong, even in a case where the content desired to be reproduced is a stereo signal, if each audio device has only a single speaker unit (a monaural speaker), it is only possible to monaural output in each audio device. For example, there is a demand to perform stereo reproduction by considering the plurality of audio devices as one device. In addition, in a case where the stereo reproduction is performed by considering the plurality of audio devices as one device, regarding the list screen of audio devices displayed on the mobile terminal device, there is also a demand to display a plurality of audio devices for performing the stereo reproduction as one device in order to make it easy to select the plurality of audio devices for performing the stereo reproduction as a transmission destination of the command.

An object of the present invention is to enable performing a display in accordance with a relationship between a plurality of reproduction devices on a list screen of a plurality of reproduction devices.

Solution to Problem

An audio system control method according to one embodiment of the present invention includes: displaying a list screen of a plurality of reproduction devices on a display unit based on relationship information between the plurality of reproduction devices which is connected via network; receiving selection of a reproduction device which is made to perform a content reproduction operation among the plurality of reproduction devices; and transmitting a command to the selected reproduction device.

A control terminal device according to one embodiment of the present invention includes: at least one processor; and at least one memory that stores a plurality of instructions, which when executed by the at least one processor, cause the at least one processor to: display a list screen of a plurality of reproduction devices on a display unit based on relationship information between the plurality of reproduction devices which is connected via network; receive selection of a reproduction device which is made to perform a content reproduction operation among the plurality of reproduction devices; and transmit a command to the selected reproduction device.

An information storage medium according to one embodiment of the present invention is a non-transitory information storage medium in which an audio system control program is recorded. The audio system control program causes a computer to: display a list screen of a plurality of reproduction devices on a display unit based on relationship information between the plurality of reproduction devices which is connected via network, receive selection of a reproduction device which is made to perform a content reproduction operation among the plurality of reproduction devices, and transmit a command to the selected reproduction device.

BRIEF DESCRIPTION OF DRAWINGS

FIG. 3 is a block diagram of an audio device according to an embodiment of the present invention.

FIG. 4 is a diagram illustrating an example of a system management table to be set in the controller.

FIG. 5 is a diagram illustrating an example of an audio control table to be set in the controller.

FIGS. 16A, 16B, 16C, 16D are diagrams illustrating an example of control screens (an initial menu screen, a device selection screen, a source selection screen, and a reproduction screen) displayed on the mobile phone.

DESCRIPTION OF EMBODIMENTS

Figure 1:
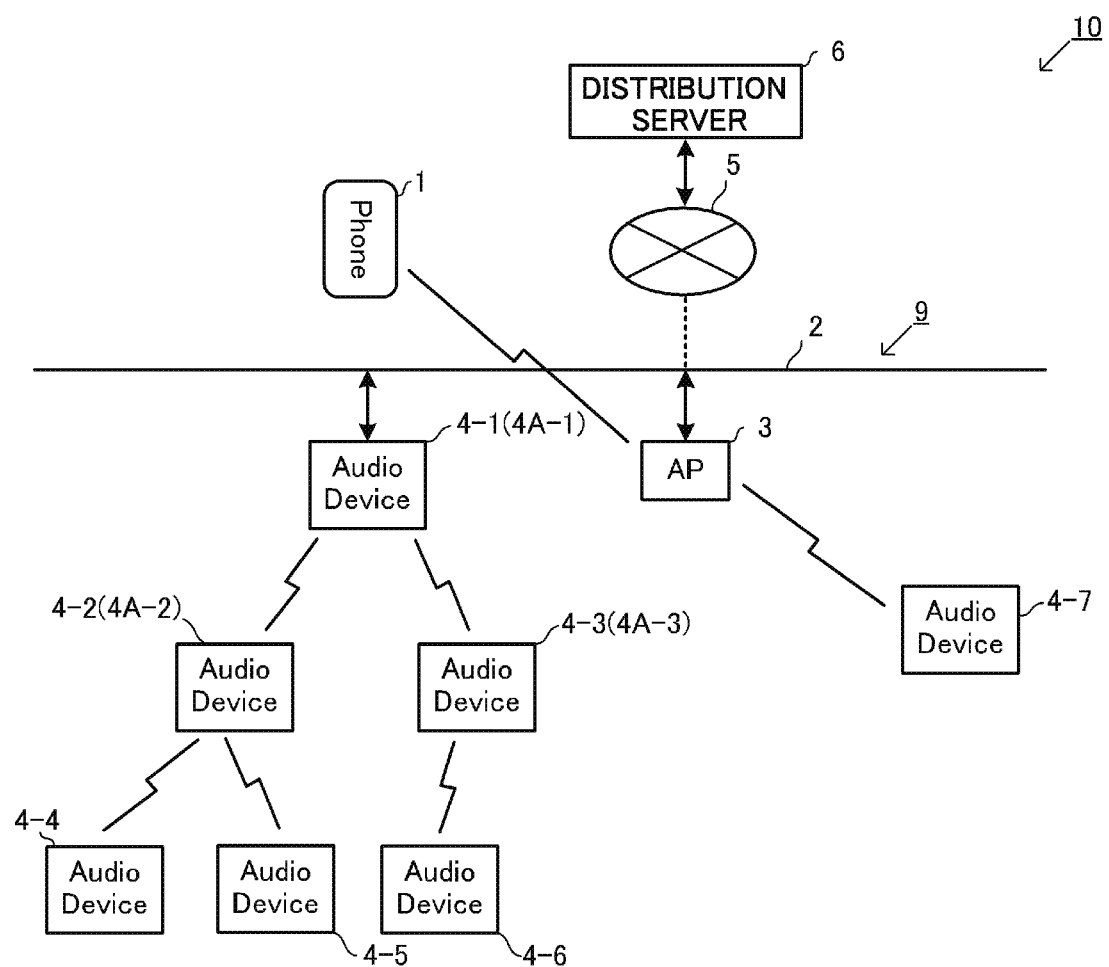
FIG. 1 is a diagram illustrating a configuration of an audio system according to an embodiment of the present invention.

FIG. 1 is a diagram illustrating a configuration of an audio system 10 according to an embodiment of the present invention. The audio system 10 includes a plurality of audio devices 4 (4-1 to 4-7) connected via a network 9 including a wired LAN 2 and an access point (external access point) 3, and a multi-functional mobile phone (mobile terminal device) 1 which functions as a controller 1. Each audio device 4 transmits and receives the audio signal with each other via the network 9. The controller 1 transmits a command message to the audio device 4 via the network 9.

Each audio device 4 (hereinafter, also referred to as a reproduction device and a component device) included in the audio system 10 has a wired LAN function and two wireless LAN functions. The audio device 4 can activate the access point using one of the two wireless LAN functions. The access point activated by the audio device 4 is called an internal access point 4A. The lower audio device 4 is connected to the internal access point 4A. Generally, the internal access point 4A is operating in a stealth mode (except during an initial connection, which will be described later), so that it is difficult for other device to know existence of the internal access point 4A. The other wireless LAN function functions as a child unit of the wireless LAN and is connected to the internal access point 4A of the upper audio device 4 or an external access point 3.

The access point (the external access point) 3 is connected to the wired LAN 2. The audio device 4-1 is connected to the wired LAN 2 with a cable. The audio devices 4-2 and 4-3 are connected to the internal access point 4A-1 of the upper audio device 4-1 via the wireless LAN. The audio devices 4-4 and 4-5 are connected to the internal access point 4A-2 of the upper audio device 4-2 via the wireless LAN. In addition, the audio device 4-6 is connected to the internal access point 4A-3 of the upper audio device 4-3 via the wireless LAN. The audio device 4-7 is connected to the external access point 3.

In the embodiment, the network 9 is configured by the wired LAN 2 and the wireless LAN including the external access point and the internal access point 4A. For example, Ethernet (registered trademark: IEEE 802.3) may be used as the wired LAN and Wi-Fi (IEEE802.11g) may be used as the wireless LAN. In addition, a distribution server 6 is connected to the network 9 (the wired LAN 2) via a gateway (not shown) and the Internet 5. The distribution server 6 distributes music data to the audio device 4.

Each audio device 4 is referred to as a root device, a node device, a leaf device, and a branch device according to the connection form of the audio device 4 with respect to the wired LAN 2. The root device is the uppermost device connected directly to the wired LAN 2 (via the cable), and the audio device 4-1 is the root device in FIG. 1. The root device is the audio device initially registered at the time of construction of the audio system 10 and serves as the basis of the audio system 10. The root device activates the internal access point 4A for connecting the lower audio device 4 to the network and making it participate in the audio system 10. All items of music information reproduced by the audio device 4 (node device or leaf device) connected to the root device or below are transmitted via the root device (the internal access point 4A of the root device).

The node device is an intermediate device connected to the root device (the internal access point 4A of the root device) via the wireless LAN, and the audio devices 4-2 and 4-3 are node devices in FIG. 1. The node device activates the internal access point 4A for connecting the lower audio device 4 to the network and making it participate in the audio system 10. The music information reproduced by the audio device 4 (leaf device) connected to the node device or lower is transmitted via the node device (the internal access point 4A of the node device).

The leaf device is a lower device connected to the node device (the internal access point 4A of the node device) via the wireless LAN, and the audio devices 4-4 to 4-6 are the leaf devices in FIG. 1. The leaf device does not activate the internal access point 4A, but may activate the internal access point 4A.

The branch device is an audio device 4 which is connected to the external access point 3 via the wireless LAN separately from a tree having the root device as a vertex and which communicates with another audio device 4 in the audio system 10 via the wired LAN 2. The audio device 4-7 is a branch device in FIG. 1. The branch device does not activate the internal access point 4A, but may activate the internal access point 4A.

In the audio system, up to two node devices are allowed to be connected to the root device in order to transmit a high quality audio signal. In addition, up to two leaf devices are allowed to be connected to each node device. In addition, a hierarchy of connection using the internal access point 4A is limited to up to three levels of the root device, the node device, and the leaf device. Therefore, up to seven audio devices including the root device can be connected via the tree of the wireless LAN with the root device as the vertex. In the tree illustrated in FIG. 1, seven audio devices 4 (4-1 to 4-7) are connected. There is no limitation on the number of branch devices, but as the control target of the controller 1, the number of audio devices 4 in the entire audio system 10 is limited to up to ten. However, in the present invention, the maximum number such as the number of hierarchies of the tree, the number of the lower devices connectable to each audio device 4, and the like are not limited to this embodiment.

In addition, each of the audio devices 4-1 to 4-7 is disposed in each room of a living room, a dining room, a bedroom, a kitchen, a room A, and a room B in the in-home, for example.

Each of the audio devices 4-1 to 4-7 in the audio system 10 can independently reproduce different contents. However, in the audio system 10, it is possible to make a plurality of audio devices to a group. In a plurality of grouped audio devices, contents supplied from the same audio source are synchronously reproduced. The content is, for example, music. The audio source includes a medium such as a CD or a hard disk provided for each of the audio devices 4-1 to 4-7, music distribution service by the distribution server 6, or the like. A file format of music data is, for example, MP3, WAV, Sound VQ (registered trademark), WMA (registered trademark), AAC or the like.

In addition, the audio system 10 pairs two or more audio devices out of the audio devices 4-1 to 4-7 (sets two or more audio devices out of the audio devices 4-1 to 4-7 as a stereo pair) and can synchronously reproduce different channels of the same content by the paired audio devices. For example, in a case where the audio devices 4-4 and 4-5 are set as the stereo pair, as the stereo reproduction, the audio signal of a right channel included in the music data (audio signal) of the same content is output from a speaker 65 of the audio device 4-4, and the audio signal of a left channel is output from the speaker 65 of the audio device 4-5. The stereo pair setting is processing different from the above-described group setting of synchronous reproduction. Hereinafter, the synchronous reproduction in stereo in stereo pair setting is referred to as "stereo reproduction", and the synchronous reproduction in group setting is referred to as "synchronous reproduction" for distinction. The group setting and synchronous reproduction will be described later.

Figure 2:
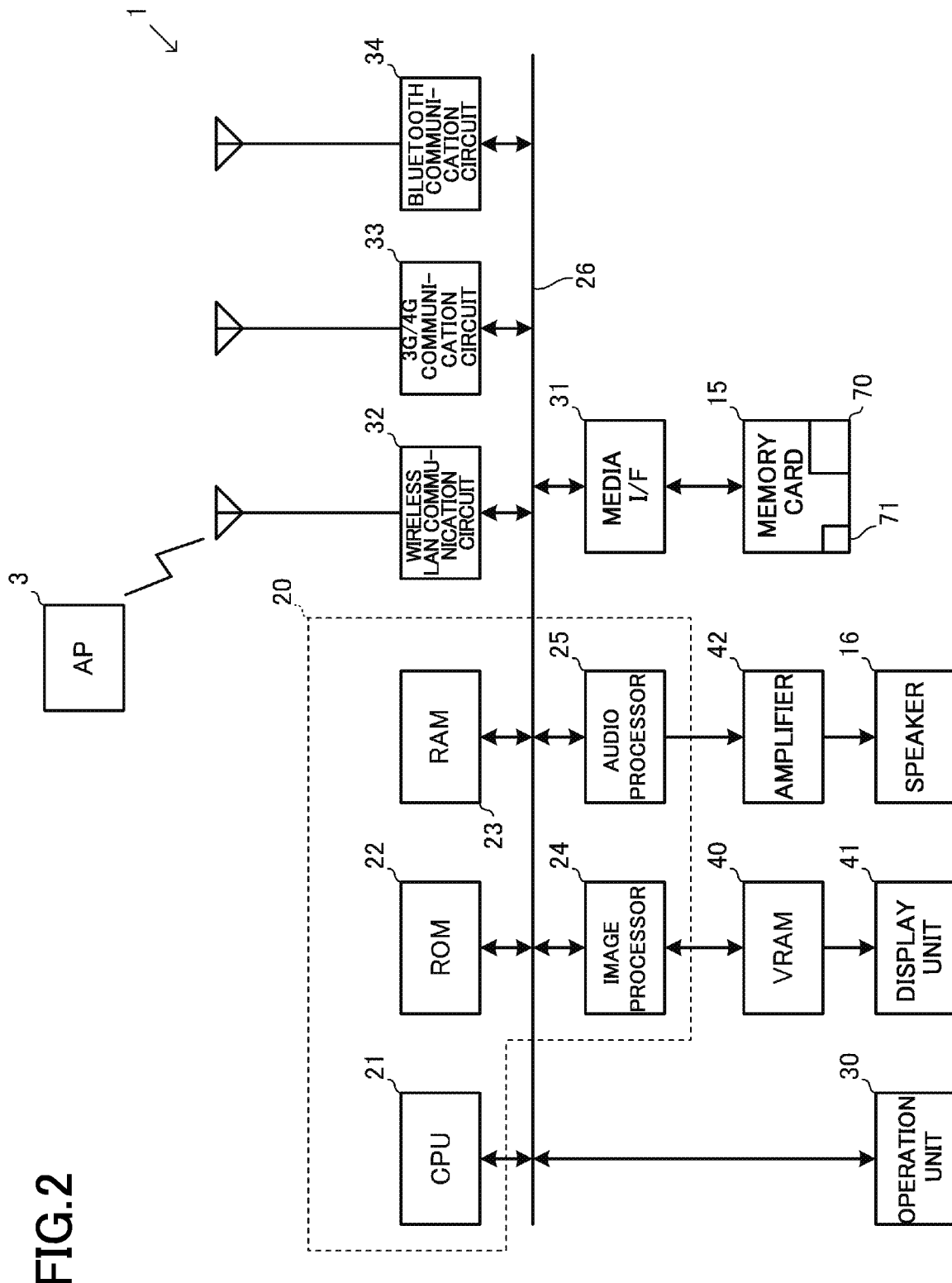
FIG. 2 is a block diagram of a mobile phone functioning as a controller according to an embodiment of the present invention.

The mobile phone 1 functions as an audio system controller (hereinafter, controller) 1 by activating an audio system control program 70 (see FIG. 2). The mobile phone 1 (controller 1) communicates with each audio device 4 belonging to the audio system 10 via the network 9. Through the communication, the controller 1 integrally controls an audio source to be reproduced by each of the audio devices 4-1 to 4-7 in the audio system 10 (For example, which audio device 4 to reproduce which music, which music to distribute to which audio device 4, or the like), a volume, or the like. Further, as the controller 1, the mobile phone 1 also performs a group setting for synchronous reproduction.

<Description of Configuration>

Next, the configuration of the mobile phone 1 will be described with reference to the block diagram of FIG. 2. The mobile phone 1 is a multifunctional telephone called a so-called smartphone. The mobile phone 1 has a 3G/4G communication function which corresponds to the mobile communication network, a wireless LAN (Wi-Fi) communication function, and a Bluetooth (registered trademark) communication function. By activating the audio system control program 70 which is an application program, the mobile phone 1 functions as the controller 1, communicates with the audio device 4 in the audio system via the network 9, and transmits a command message corresponding to the operation of the user to the audio device 4 to control the audio system 10.

The mobile phone 1 includes a control unit 20, an operation unit 30, a media interface 31, a wireless LAN communication circuit 32, a 3G/4G communication circuit 33, and a Bluetooth (registered trademark) communication unit 34 on a bus 26. The control unit 20 includes a CPU 21, a ROM (flash memory) 22, a RAM 23, an image processor 24, and an audio processor 25. A video RAM (VRAM) 40 is connected to the image processor 24, and a display unit 41 is connected to the VRAM 40. The display unit 41 includes a liquid crystal display. A standby screen, a telephone number, or the like are displayed on the display. Further, in a case where the mobile phone 1 functions as the controller 1, a screen for controlling the audio device 4 is displayed. An amplifier 42 including a D/A converter is connected to the audio processor 25, and the speaker 16 is connected to the amplifier 42.

The image processor 24 includes a GPU (Graphics Processing Unit) for generating various images such as a standby screen and a telephone number. In a case where the audio system control program 70 is activated, the image processor 24 generates an image of the audio controller in accordance with an instruction from the CPU 21, and develops the image on the VRAM 40. An image developed on the VRAM 40 is displayed on the display unit 41. The audio processor 25 has a DSP (Digital Signal Processor) for encoding and decoding speech voice. The audio processor 25 outputs the decoded and generated audio to the amplifier 42. The amplifier 42 amplifies the audio signal and outputs the signal to the speaker 16.

The wireless LAN communication circuit 32 performs wireless communication with the router according to the standard such as IEEE 802.11g, and communicates with the audio device 4 via the access point 3. The 3G/4G communication circuit 33 performs voice communication and data communication via a mobile phone communication network. The Bluetooth communication unit 34 communicates with other Bluetooth-compatible device, for example, performs transmission and reception of audio signals, and the like.

The operation unit 30 includes a touch panel 310 (see FIG. 16 and the like) formed on the display unit 41, and detects a touch operation or a flick operation on the touch panel 310. When the audio system control program 70 is activated, a plurality of operators such as a setup button or a scan button are displayed on the display unit 41. The operation unit 30 detects the touch operation performed by the user and a coordinate of the touch position on the touch panel 310, and determines which operator is operated.

A memory card 15 is connected to the media interface 31. The memory card 15 is, for example, a micro SD card. The audio system control program 70 is stored in the memory card 15 or the ROM 22. In the embodiment, as illustrated in FIG. 2, it is assumed that the audio system control program 70 is stored in the memory card 15. The audio system control program 70 may be downloaded via 3G/4G data communication, or wireless LAN data communication, or may be stored in the ROM 22 or the memory card 15 in advance. In addition, in the memory card 15, a storage area 71 for storing a configuration of the audio system (a system management table, an audio control table, or the like to be described later) is set.

In the ROM 22, a basic program for executing a call with the mobile phone 1 and an application program are stored. In addition, the ROM 22 is a flash memory, and it is also possible to store not only the basic program but also downloaded application programs or the like. In the RAM 23, a work area to be used when the CPU 21 executes the audio system control program 70 is set.

Next, the configuration of the audio device 4 will be described with reference to FIG. 3. The audio device 4 includes a control unit 50, an audio processing unit 51, the speaker 65, an operation unit 59, a memory 60, a lighting circuit 61, and an LED 62, and also includes two wireless LAN communication units (RF modules) 56 and 57 and a wired LAN communication unit 58. The operation unit 59 has a connect button 59A, a reproduction/pause button 59B, a volume up button 59C and a volume down button 59D. The control unit 50 includes the CPU and the memory and stores an audio system program 50A. The control unit 50 controls the operations of the audio processing unit 51, the wireless LAN communication units 56 and 57, the wired LAN communication unit 58, and the lighting circuit 61 based on the audio system program 50A. Further, when the connect button 59A is pressed, the control unit 50 executes the initial connection operation, which is an operation for connecting the audio device 4 to the network (the audio system 10). Detailed description of the initial connection operation is omitted.

Further, when the reproduction/pause button 59B is pressed, the control unit 50 controls the audio processing unit 51 and the like to execute the reproduction operation of the audio source. In addition, when the volume up button 59C or the volume down button 59D are pressed, the control unit 50 controls the audio processing unit 51 to up or down the volume of the audio source. In addition, when the reproduction/pause button 59B and the volume up button 59C are simultaneously pressed long (for example, pressed for 3 seconds), the control unit 50 executes stereo pair setting for Rch (right channel). Furthermore, when the reproduction/pause button 59B and the volume down button 59D are simultaneously pressed long (for example, pressed for 3 seconds), the control unit 50 executes stereo pair setting for Lch (left channel). The stereo pair setting will be described later.

In addition, by executing the audio system program 50A, the control unit 50 also functions as a synchronous reproduction controller that serves as a master for controlling synchronous reproduction of contents.

The wireless LAN communication unit 56 performs wireless communication with the external access point 3 or the internal access point 4A of the upper audio device 4 according to the wireless LAN standard such as IEEE 802.11g. The other wireless LAN communication unit 57 is activated as an access point (internal access point 4A) and relays (connects) other audio devices (for example, audio devices 4-2, 4-3, and the like) to the wired LAN 2. In addition, when the audio device 4 is initialized, the wireless LAN communication unit 57 is activated as a temporary access point for initial connection and communicates with the controller 1 (the mobile phone 1). The operation at the initial connection will be described later. The two wireless LAN communication units 56 and 57 may be realized by operating one piece of hardware in a time division manner. The wired LAN communication unit 58 has a cable connector and performs communication via the wired LAN 2 and the access point 3 according to a communication standard such as IEEE 802.3. The controller (the mobile phone) 1 is connected to the access point 3, and the control unit 50 communicates with the controller 1 via the network 9, transmits an operation state, and receives a command message.

SSID and password of the internal access point 4A are character strings which can be obtained from a MAC address of the wireless LAN communication unit 57. For example, an octet representation of the MAC address may be set as the SSID and the lower 3 octets (model 1D+serial number) may be set as the password. Accordingly, the audio device newly participating in the audio system can find the internal access point 4A based on the SSID, that is, based on the vendor ID and the model ID of the MAC address. Further, the audio device newly participating in the audio system can generate a password by itself and connect to the found internal access point 4A. Accordingly, it is possible to omit the user's input of SSID and password in a case of connecting to the internal access point 4A. The method of generating the SSID and password of the internal access point 4A is not limited to the above.

The audio processing unit 51 includes a tuner 52, an audio circuit 53, and a power amplifier 55. The tuner 52 receives the audio signal from FM broadcasting or the Internet and inputs the audio signal to the audio circuit 53. The audio circuit 53 performs processing such as equalization and volume adjustment on the input audio signal.

Further, during the stereo pair setting is made effective, the audio circuit 53 separates the Rch or Lch audio signal from the input audio signal for stereo reproduction with the other audio device 4 to be paired. For example, in a case where the audio device 4 is set to Rch in the stereo pair setting, the audio circuit 53 separates the Rch audio signal from the input audio signal.

Then, the audio circuit 53 outputs the processed audio signal to the power amplifier 55. The power amplifier 55 amplifies the input audio signal and outputs it to the externally connected speaker 65. The speaker 65 is a monaural speaker, for example, and emits a sound of an input audio signal.

In addition, the audio circuit 53 can output the processed audio signal to communication units 56, 57, and 58 so as to transmit to another audio device 4 for synchronous reproduction or the like. Furthermore, the audio signal transmitted from the another audio device 4 for synchronous reproduction or the like is input to the audio circuit 53 via the communication unit 56, 57, or 58.

The memory 60 is, for example, an EEPROM and stores device information (device name, MAC address and IP address of the wireless LAN communication unit, installation location, pairing information, grouping information, or the like) of the audio device 4 itself, system information (system management table: see FIG. 4), reproduction parameters, and the like. The device name includes "device name" written when the device is shipped.

The pairing information (relationship information between devices) is information on stereo reproduction with anther audio device 4 which is set as the pair. Specifically, the information includes information on presence/absence of pairing, parent-child information, reproduction channel information (Rch/Lch). The parent-child information includes information specifying whether the device itself is a parent device or a child device, and information specifying another audio device to be paired. For example, an IP address is used as the information for specifying another audio device. The reproduction channel is information for specifying the reproduction channel (Rch/Lch) of the audio signal reproduced by the audio device itself. The reproduction parameter is setting information concerning reproduction by each audio device 4. For example, setting information such as an equalizer and a volume set by the controller 1 and transmitted to the audio device 4 is included.

The setting of the parent device and child device in the present embodiment is determined based on the connection position of each audio device 4. Priorities are associated with the connection positions. In the embodiment, in the descending order of priority, they are a route (wired connection), a branch (router connection such as an access point), a node, and a leaf. In a case where the priorities are equal, for example, the audio device 4 of Rch setting may be used as the parent device. Further, the priority order may be appropriately set, and setting of the parent device and the child device may not be performed based on the priority order.

The grouping information is information on the synchronous reproduction group. Specifically the information includes presence/absence of group setting, and the master and client information. The master/client information includes information specifying whether the device itself is the master or a client of synchronous reproduction, and information specifying the master and the client. The information specifying the master and the client is, for example, an IP address. The master and client will be described later.

The lighting circuit 61 turns on the LED 62. For example, the lighting circuit turns on the LED 62 during activation of the audio device 4 and informs the user of the activation state. In the present embodiment, while activating the audio device 4, by pressing only the reproduction/pause button 59B long (for example, 3 seconds), lighting for notifying the reproduction channel of the stereo pair setting of the audio device 4 is performed. In a case of the Rch setting, the LED 62 blinks with a short blinking interval, and in the case of the Lch, the LED 62 blinks at a longer blinking interval than in the case of the Rch. The control unit 50 controls the blinking operation based on the stereo pair setting information described above.

The audio devices 4-1 to 4-7 may be different devices, but the basic configuration of the communication function and the audio signal processing function is as illustrated in FIG. 3.

<Description of Table>

FIGS. 4 and 5 are diagrams illustrating an example of a table for managing the audio system 10. FIG. 4 is a system management table for managing the connection state of each audio device 4 in the network 9. FIG. 5 is an audio control table for managing the operation of each audio device 4 in the audio system 10. The system management table is mainly used by a root device 4-1 to manage the network connection. In addition, the audio control table is mainly used by the controller 1 to control the reproduction of the audio source.

The system management table stores the connection state of each audio device 4 (component device) included in the audio system 10. The system management table is generated by the controller 1 when the audio system 10 is constructed. In addition, in a case where a new audio device 4 is added to the audio system 10, the controller 1 updates the system management table to perform the addition of the audio device 4. The system management table generated or additionally updated is transmitted from the controller 1 to the root device 4-1. Thereafter, during the operation of the audio system 10, each time a disconnection or reconnection of any of the component devices occurs, disconnection or reconnection is detected by the root device 4-1, and the contents of the system management table are updated. In addition, the root device 4-1 periodically transmits all or a part of the contents of the system management table as system information to each component device and the controller 1. Accordingly, each component device and the controller 1 can always hold the latest system information. The detailed operation of the transmission of the system information will be described later.

The system management table is identified by the system ID (not described in detail) assigned to each audio system 10. Each component device stores information of the MAC addresses of the upper side (child device side) and lower side (internal access point side) (that is, the MAC addresses of the wireless LAN communication units 56 and 57), the IP addresses of the upper side and the lower side (that is the IP addresses of the wireless LAN communication units 56 and 57), number of connection stages from the root device 4-1 (HOP number), presence/absence of activation of the internal access point, the number of the lower devices connected to the internal access point 4A (the number of the child devices), and or the like corresponding to the device ID of each device.

Although each component device has a separate IP address, the audio system 10 has a multicast address set as a multicast group. By transmitting the IP packet of the above system information to the multicast address, all of the component devices in the audio system 10 can receive this system information packet. The system information packet may be transmitted to the IP address of each component device by unicast, but the load on the network 9 can be reduced by multicast transmission.

In the audio control table of FIG. 5, the upper side address (the IP address of the wireless LAN communication unit 56), the model, the installation location, the grouping, the pairing, the service, and various setting information of the component device are stored corresponding to the device ID of each device. Each section of the audio control table and each section of the system management table are associated with each other by the device ID. The controller 1 generates a control screen (see FIGS. 16 and 17) based on the contents of the audio control table, and receives control of each component device by the user. The controller 1 periodically transmits all or a part of the contents of the audio control table as setting information to each component device. As a result, each component device can always hold the latest setting information.

The model information is information (for example, text data) of the device name of the audio device 4. The installation location information is information for specifying the room where the audio device 4 is installed. The grouping information is information on a group to which the audio device 4 belongs, and indicates a group for the abovementioned synchronous reproduction of content. In the embodiment, only one group is set. In addition, the audio device 4 belonging to one group is set to either the synchronous reproduction master (master device) or the synchronous reproduction client (client device).

The synchronous reproduction master is in charge of supplying the audio source to the whole group and controlling synchronous reproduction, and the synchronous reproduction master itself also functions as one device of synchronous reproduction. The synchronous reproduction client reproduces the content according to the instruction of the synchronous reproduction master. For example, "1A" illustrated in FIG. 5 indicates the audio device 4 belonging to the group as the synchronous reproduction master. In addition, "1B" indicates the audio device 4 belonging to the group as a synchronous reproduction client. The audio device 4 other than the audio devices 4 with "1A" and "1B" is the audio device 4 not belonging to the group. As described above, the group can be formed by operating the controller 1 to set the master, the client, or the like in a device unit. Details will be described later.

The pairing information is information on two audio devices 4 to be paired to perform stereo reproduction. Specifically, information on pairing number, parent-child relationship, and the reproduction channel (Rch or Lch) is registered. The pairing number is a number for specifying which audio device 4 is subjected to pairing. The parent-child relationship is information for specifying which of the two audio devices 4 to be paired is the parent device or the child device. The reproduction channel is information specifying which one of the two audio devices 4 to be paired to reproduce the Rch audio signal or the Lch audio signal. In the present embodiment, these items of information are described as numerical information in the order of (the pairing number, the reproduction channel, and the parent-child relationship).

When the stereo pair is set between the audio devices 4, the pairing information included in the audio control table is updated based on the pairing information acquired at the time when the controller 1 performs a polling of each device.

The service information is information on an audio source that can be reproduced by an audio device, and includes a CD (CD player), a radio (including FM broadcasting, net radio), net distribution, or the like. The net distribution is a function that the audio device 4 accesses the distribution server 6 of the music distribution service via the Internet 5 and downloads and reproduces the audio data of the music (content) selected by the user by streaming.

The various setting information includes various setting information items such as reproduction parameters of each audio device 4. The reproduction parameter is setting information concerning reproduction by each audio device 4. For example, setting information of the equalizer and volume is included. In the parent device and the child device set as the stereo pair, since the reproduction parameters of the parent device are common reproduction parameters, the reproduction parameters of the parent device and the child device have the same contents.

In the case of constructing the audio system 10, the root device 4-1 is first set by the control application executed in the controller 1 to construct the audio system 10. Thereafter, the audio devices 4 other than the root device 4-1 are added to the audio system 10. The user operates in the following procedure. The user connects the audio device 4-1 that functions as the root device to the wired LAN 2 with the cable. The user activates the controller 1 in a setup mode on the mobile phone 1. The user presses the connect button 59A of the audio device 4-1 according to the instruction of the screen of the controller 1. If the user performs the above-described operations, the controller 1 and the root device 4-1 communicate with each other, and the audio system 10 is automatically constructed. Thereafter, in a case of adding a new audio device 4 to the audio system 10, if the user activates the controller 1 in the setup mode, turns on the power of the audio device 4 to be added (activates the wireless LAN communication units 56 and 57), and presses the connect button 59A, the audio device 4 communicates with the controller 1 and the root device 4-1. In this case, the audio device 4 is automatically added to the audio system 10 by automatically generating a password from the above SSID.

<Description of Audio System Construction Procedure>

The communication procedure between the controller 1 and the audio device 4 when constructing the audio system 10 or adding the audio device 4 to the audio system 10 will be described with reference to FIGS. 6 to 9.

Figure 6:
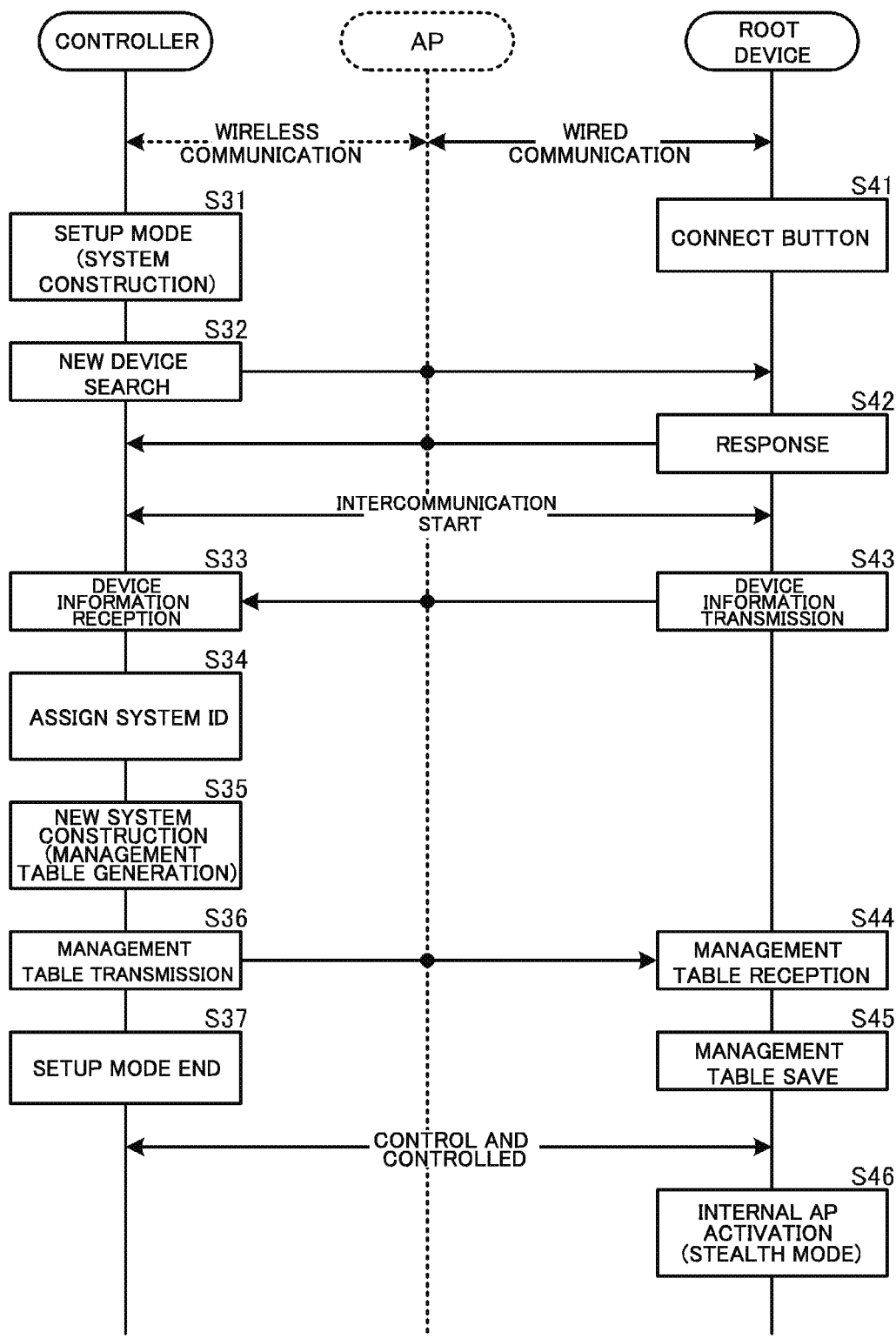
FIG. 6 is a diagram illustrating a communication procedure between the controller and the audio device.

FIG. 6 is a diagram illustrating a communication procedure between the controller 1 and the audio device 4-1 that functions as the root device in the case of newly constructing the audio system 10. The audio system control program 70 (application) is activated on the mobile phone 1, and the mobile phone 1 functions as the controller 1. When the controller 1 becomes the setup mode according to the operation of the user (S31), a guide screen prompting the user to press the connect button 59A of the audio device 4 is displayed on the display unit 41. According to the guidance on the screen, the user presses the connect button 59A of the audio device 4-1 (S41). Next, the controller 1 searches for a new audio device connected to the wired LAN 2 (S32). This search is performed by transmitting a message requesting a response such as polling. The audio device 4-1 responds to the search (S42). As a result, the controller 1 and the audio device 4-1 start intercommunication via the wired LAN 2 and the access point 3.

The audio device 4-1 transmits its own device information (MAC address, IP address, or the like of the wireless LAN communication unit) to the controller 1 (S43). The controller 1 constructs a new audio system 10 in which the audio device 4-1 serves as the root device. A system ID is assigned to the audio system 10 (S34), a system management table and an audio control table illustrated in FIGS. 4 and 5 are created, and an audio system 10 in which the audio device 4 currently communicating with the controller 1 serves as the root device is constructed (S35). When the audio system 10 is constructed, the system management table is transmitted to the audio device 4-1 serving as the root device (S36), and the setup mode is ended (S37). The audio device 4-1 receives the system management table (S44) and saves the table (S45). As a result, the audio system 10 in which the audio device 4-1 serves as the root device which is the key constituent element (component) is constructed. Thereafter, the controller 1 controls the music reproduction and the sound volume thereof. The audio device 4 activates the access point in the stealth mode (S46).

Figure 7:
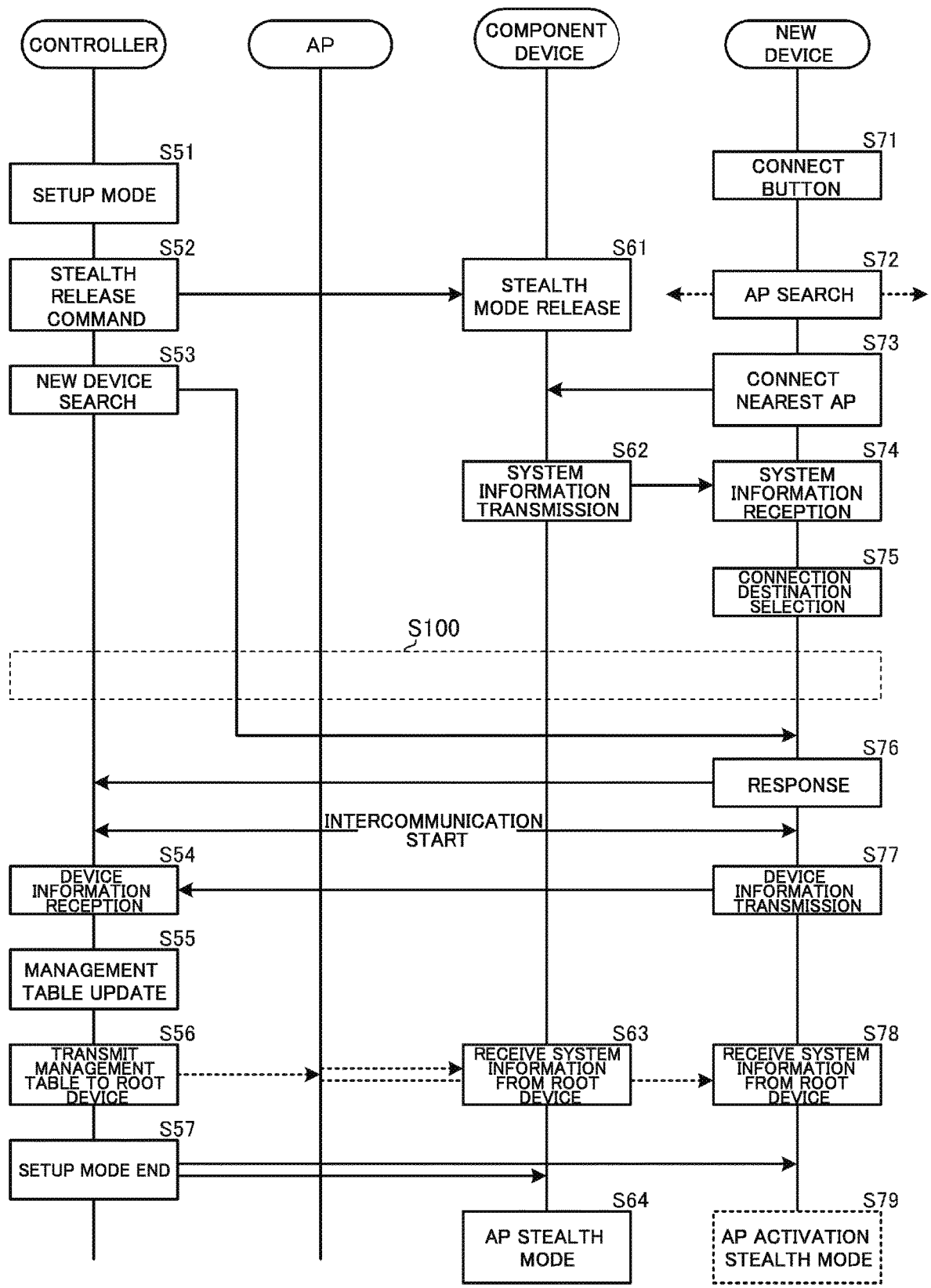
FIG. 7 is a diagram illustrating communication procedure of the controller and the audio device.

FIG. 7 is a diagram illustrating a communication procedure in a case where a new audio device is added to the constructed audio system 10. The component device is the audio device 4 which is already a constituent element of the audio system 10. Here, the component device is the root device or the node device which activates the internal access point 4A. The new device is the newly added audio device 4 from now on.

When the mobile phone 1 functioning as the controller 1 becomes the setup mode by the user's operation (S51), the guide screen prompting the user to press the connect button 59A of the audio device 4 (new device) is displayed on the display unit 41. According to the guidance on the screen, the user presses the connect button 59A of the new device (S71). The controller instructs the component device which is the already registered audio device 4 to cancel the stealth mode of the internal access point 4A (S52). As a result, the component device cancels the stealth mode of the internal access point 4A, transmits a beacon frame informing of the existence of the internal access point 4A to enable passive scanning by the new device (S61). Next, the controller 1 starts searching for a new device (S53).

When the user presses the connect button 59A (S71), the new device becomes the initial connection mode, and searches a connectable access point (passive scan) (S72). In this search, the new device finds the internal access point 4A of the component device as a connectable access point. As described above, the internal access point 4A has an SSID allowing the new device to identify the device as the device in the audio system 10, and the new device can generate a password based on the SSID (or MAC address) and connect to the internal access point 4A. The new device selects the nearest internal access point 4A (the easiest to connect) from the found internal access points 4A and temporarily connects to the selected internal access point 4A using the SSID and the generated password (S73). This connection is a temporary connection for acquiring the system information and is not a regular connection for participating in the audio system 10. The new device acquires the current system information of the audio system 10 from the connected internal access point 4A (component device) (S62 and S74). The system information is information including the contents of all or a part of the system management table, and is periodically updated by the root device 4-1 and distributed to other component devices. Based on the acquired system information, the new device selects an optimum access point to participate in the audio system 10 (S75). This selection is performed based on a radio field intensity of each access point, the number of connection stages from the root device 4-1, the number of component devices connected to the access point, or the like, and the access point with good communication conditions is selected.

Figure 8:
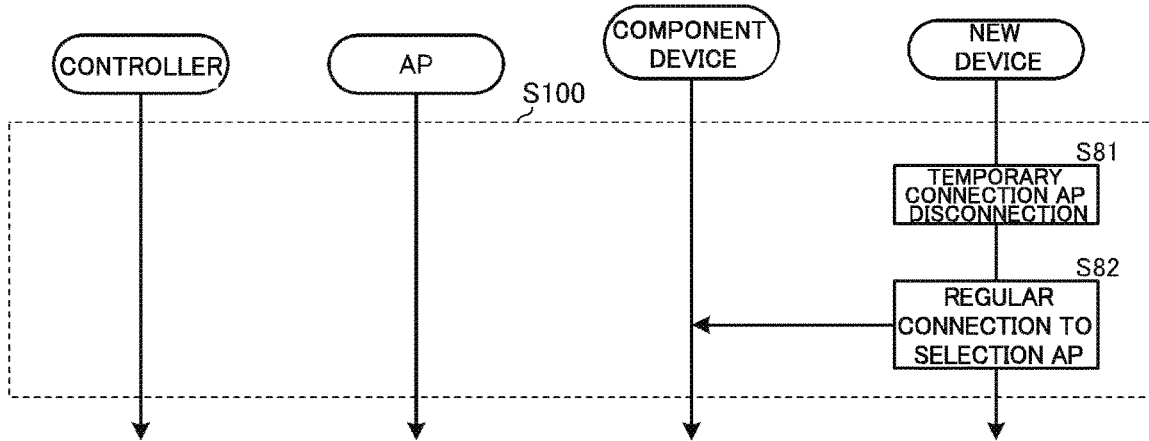
FIG. 8 is a diagram illustrating a communication procedure between the controller and the audio device.
Figure 9:
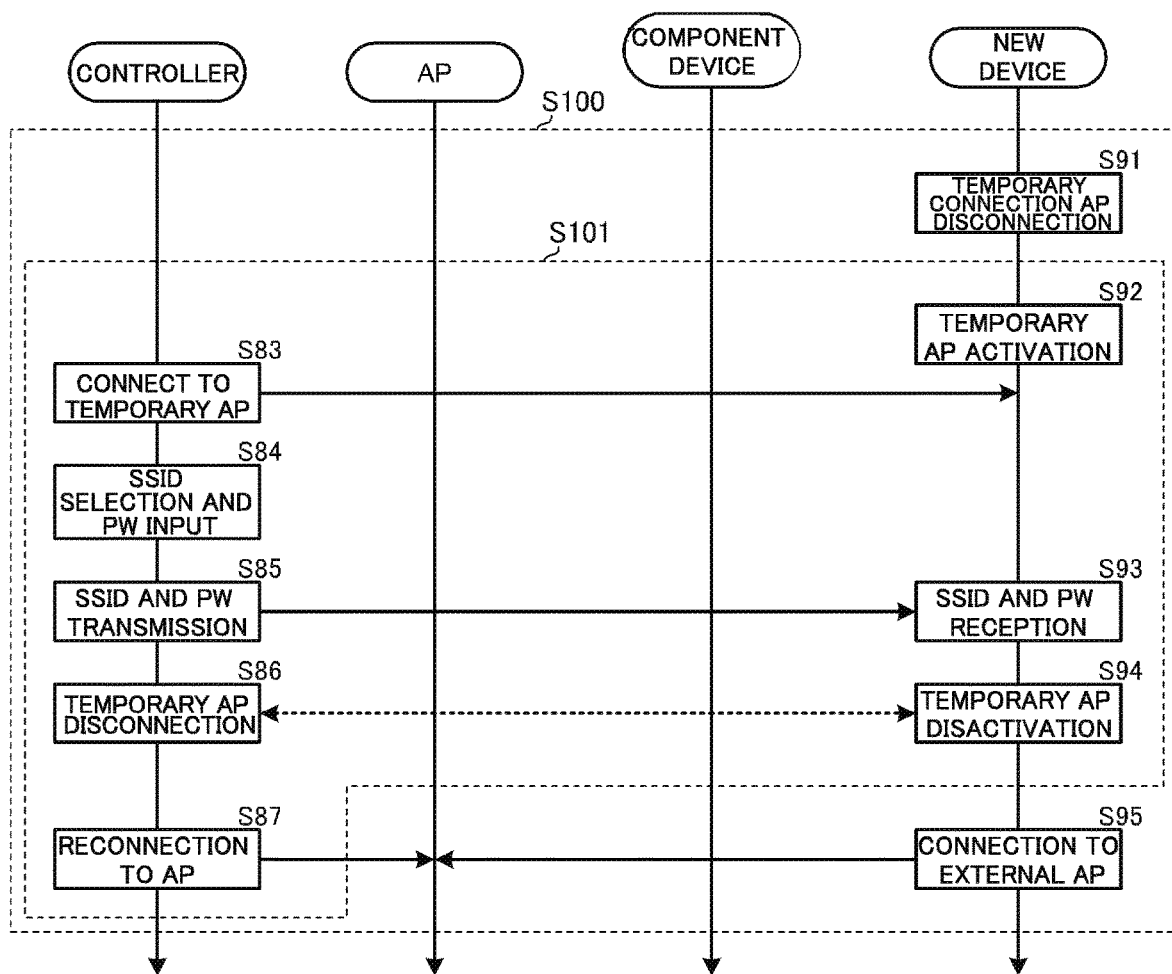
FIG. 9 is a diagram illustrating a communication procedure between the controller and the audio device.

In the example of FIG. 7 (an example in which S100 is not executed), the flow is illustrated in a case where it is determined that the temporarily connected internal access point 4A is optimal in the regular connection and the connection destination is not changed. For example, it corresponds to the case where the new device connects to the internal access point 4A-1 of the root device 4-1, and the like. In a case where the connection destination in the regular connection is changed from the temporarily connected internal access point 4A, the procedure of FIG. 8 or 9 is executed in the section of S100 illustrated in FIG. 7. When the regular connection is completed (after setting the temporary connection as the regular connection in the case of FIG. 7), the new device receives the new device search message from the controller 1 (S53) and responds to the message (S76). In this way, the new device can communicate with the controller 1. As a result, the music to be reproduced in the new device, the sound volume thereof, and the like are controlled by the controller 1, and the new device becomes the constituent element (the component) of the audio system 10.

The new device transmits its own device information (MAC address, IP address, allocation location, or the like of the wireless LAN communication unit) to the controller 1 (S77). The controller 1 receives this device information (S54), and registers the new audio device 4 in the system management table and the audio control table to update these table (S55). The controller 1 transmits the updated system management table to the root device 4-1 (S56), and ends the setup mode (S57). The root device 4-1 periodically distributes system information including the contents of all or a part of the system management table to other component devices as a connection confirmation message. The notification of the end of the setup mode is transmitted from the controller 1 to all the audio devices 4. However, the controller 1 may transmit the notification to the root device 4-1 and the root device 4-1 may transfer the notification to the other audio device 4 of the audio system 10.

The new device that has received the system information from the root device 4-1 saves this system information (S78). Thereafter, the new device activates the internal access point 4A in the stealth mode (S79). In addition, the component device that has received the system information from the root device 4-1 updates the system information stored internally with the information (S63). The internal access point 4A of the component device is returned to the stealth mode (S64). By the above processing, a new device can be added to the constructed audio system 10. Regarding both the component device and the new devices, the internal access point 4A is set up in the stealth mode only in the root device and the node device. Accordingly, the processes of S64 and S79 are not performed in the leaf device and the branch device.

FIG. 8 is a diagram illustrating a communication procedure in a case where the new device disconnects the temporary connection with the internal access point 4A in S75 and reconnects to the other internal access point 4A in the tree. When the other internal access point 4A is selected as the connection destination of the regular connection in S75 of FIG. 6, the new device disconnects the present temporary connection with the internal access point 4A (S81) and makes the regular connection to the selected internal access point 4A, using the address information in the system information (S82). Thereafter, the process proceeds to S76 of FIG. 7.

FIG. 9 is a diagram illustrating a communication procedure in a case where the new device disconnects the temporary connection with the internal access point 4A in S75 and reconnects to the external access point 3 as the branch device. When the external access point 3 is selected as the connection destination of the regular connection in S75 of FIG. 6, the new device disconnects the present temporary connection with the internal access point 4A (S91), and activates the temporary access point only at the time of the initial connection in the stand-alone mode (S92). That is, the internal access point 4A which is not connected to the wired LAN 2 but only connected to the new device is activated. The controller 1 previously stores the SSID and the password of the temporary access point for the initial connection. That is, the SSID and the password are written in advance in the audio system control program 70 as data. Accordingly, the controller 1 finds the temporary access point in the new device search started in S53, cancels the connection with the external access point 3 once, and connects to the temporary access point activated by the new device (S83). In this case, since there is a high possibility that the SSID and the password of the external access point 3 cannot be acquired from the system program of the mobile phone 1, the controller 1 requests the user to input the SSID and the password of the external access point 3 (S84). The input of the SSID may be a method of displaying a list of connection destinations (SSID) that are found at that time on the display and prompting the user to select the SSID of the external access point 3. The password (generally written on the main body of external access point 3) is to be input by the user.

The input connection information is transmitted to the new device in which the temporary access point is activated (S85). The new device receives the connection information (S93). After transmitting the connection information (SSID and password) of the external access point 3 to the new device, the controller 1 cancels the connection with the temporary access point (S86). When receiving the connection information of the external access point 3 from the controller 1, the new device disactivates the temporary access point (S94). The controller 1 reconnects to the external access point 3 once disconnected (S87). The new device also connects to the external access point 3 using the acquired connection information (S95). Thereafter, returning to the procedure of FIG. 7, the controller 1 performs new device search (S53), and the new device responds to the search (S76). In a case where the connection information of the external access point 3 is included in the system information acquired from the temporarily connected component device, the processing (S83 to S87 and S92 to 94) indicated in S101 may be omitted, and the reconnection to the external access point 3 may be made in the same manner in FIG. 8.

<Description of Stereo Pair Setting and Canceling Procedure>

Figure 10A:
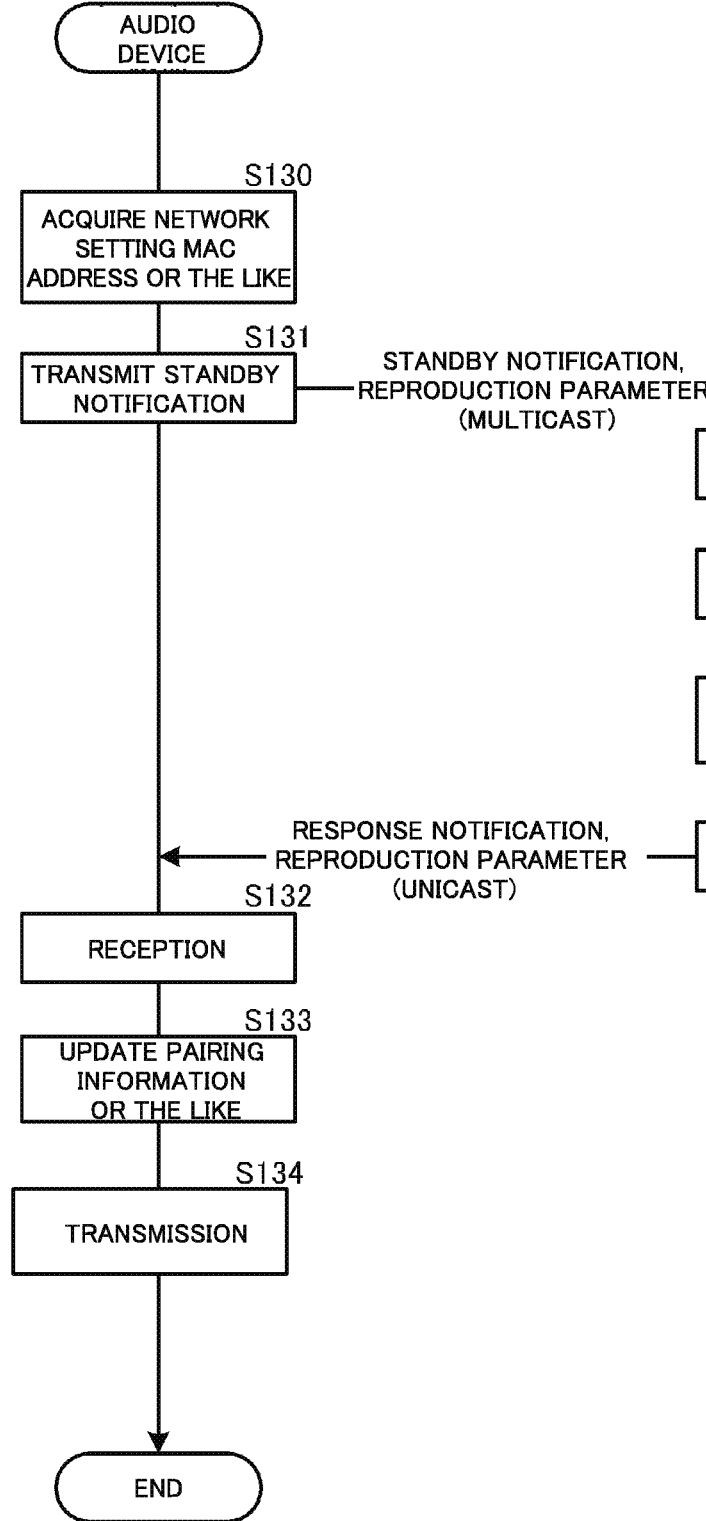
FIGS. 10A and 10B are a flowchart illustrating setting processing of a stereo pair of Rch and Lch executed by the control unit of the audio device.
Figure 10B:
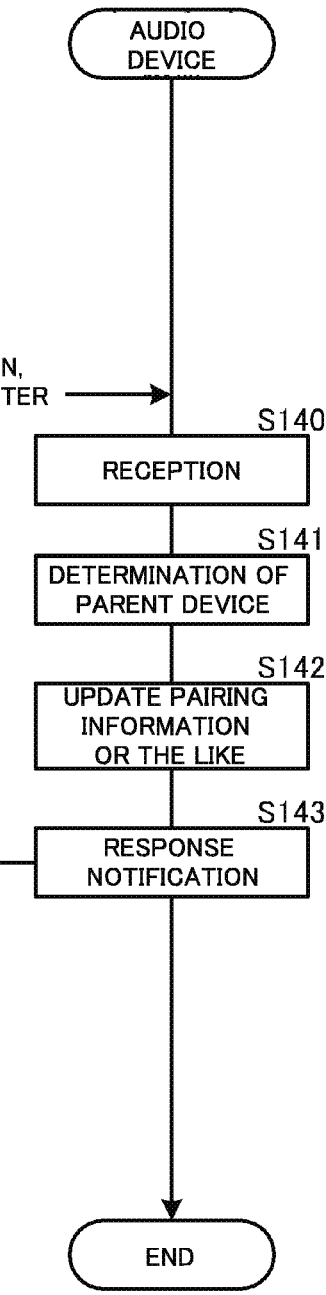

Next, the stereo pair setting process will be described with reference to the flowchart illustrated in FIG. 10. FIG. 10(A) is a flowchart illustrating stereo pair setting processing of Rch. FIG. 10(B) is a flowchart illustrating Lch stereo pair setting processing of Lch. In each stereo pair setting processing, two audio devices 4 to be paired are specified, and setting of the parent device and the child device and setting of R/Lch are performed.

The stereo pair setting processing of Rch is executed when the reproduction/pause button 59B and the volume up button 59C of the audio device 4 to be set as the Rch of the stereo pair are simultaneously pressed long. On the other hand, the Lch stereo pair setting process is started when the Reproduction/pause button 59B and the volume down button 59D of the audio device 4 to be set as the Lch of the stereo pair are simultaneously pressed long. That is, at the start of the stereo pair setting processing, the setting of R/Lch in the stereo pair setting is determined based on which combination button is pressed long as described above.

Hereinafter, as an example, a case where the reproduction/pause button 59B and the volume up button 59C of the audio device 4-4 are simultaneously pressed long time and the reproduction/pause button 59B and the volume down button 59D of the audio device 4-5 are simultaneously pressed will be described.

The audio device 4-4 acquires its own connection position (priority order information) and the MAC address 1 (identification information) from the stored system management table (S130). Then, the audio device 4-4 transmits the standby notification including the acquired connection position, the MAC address 1 and the reproduction parameter to other audio devices 4 in the audio system 10 by multicast (S131).

The reproduction parameter is a reproduction parameter stored in the audio device 4-4. In the present embodiment, the reproduction parameter of the parent device are a common reproduction parameter in the parent device and the child device which are set as the stereo pair.

On the other hand, the audio device 4-5 receives the standby notification transmitted by the multicast (S140), compares the received connection position with its own connection position, and determines the parent-child relationship (S141). Since the audio devices 4-4 and 4-5 are the leaf devices and the priorities of the audio devices 4-4 and 4-5 are the same, the audio device 4-4 which is set to Rch is determined as the parent device.

Next, the audio device 4-5 updates each setting such as the pairing information (S142). In a case where the audio device 4-4 becomes the parent device, in addition to the pairing information, the audio device 4-5 updates its own reproduction parameter with the reproduction parameter which is received with the standby notification. On the other hand, in a case where the audio device 4-4 becomes the child device, the reproduction parameter is not updated. Thereafter, the audio device 4-5 transmits the response notification (ACK) including the parent-child relationship, its own reproduction parameter and its own MAC address 1 to the audio device 4-4 in unicast (S143).

Thereafter, the audio device 4-4 receives the response notification (S132) and updates each setting such as the pairing information in the same manner as described above (S133). Also in this case, in a case where the audio device 4-5 becomes the parent device, the audio device 4-4 updates its own reproduction parameter with the reproduction parameter which is received with the response notification. On the other hand, in a case where the audio device 4-5 becomes the child device, the reproduction parameter is not updated.

Thereafter, the audio device 4-4 which is the parent device transmits the pairing information to the controller 1 (S134). The controller 1 which has received the pairing information updates the pairing information in the audio control table. Instead of S134, the child device may transmit the pairing information to the controller 1 after the response notification in S143.

The audio device 4-4 performs multicast transmission in S131. In this case, the audio device 4-4 may perform multicast transmission repeatedly for 5 minutes, for example, and finish the processing by timeout if there is no response notification. Also in the audio device 4-5, if the standby notification is not received for 5 minutes after starting the stereo pair setting processing of Lch, for example, the processing may be finished by a timeout.

In addition, if the stereo pair setting processings of Rch and Lch are started at a timing at which timeout does not occur, any one processing may be started first.

Furthermore, in the stereo pair setting processing described above, the standby notification including the priority information is transmitted, and the parent-child relationship is determined in the opponent's audio device 4. However, if each audio device 4 stores the priority order information of all the audio devices 4, the parent-child relationship may be determined by each audio device 4. In this case, it is not necessary to include information on the connection position in the standby notification. In addition, it is not necessary to include the parent-child relationship in the response notification. Furthermore, if each audio device 4 stores the reproduction parameters of all the audio devices 4, the reproduction parameter may not be included in the standby notification and the response notification.

Next, the stereo pair cancel process will be described with reference to the flowchart illustrated in FIG. 11. In the stereo pair cancel processing, the currently set stereo pair setting is canceled (reset). This processing is started by performing a cancel operation on the parent device or the child device. For example, in a case where the reproduction/pause button 59B and the volume up button 59C of the parent device or the child device are simultaneously pressed long, execution is started by the parent device or the child device which has been pressed long. Hereinafter, in the above example, a case where the reproduction/pause button 59B and the volume up button 59C of the child device 4-5 are simultaneously pressed long will be described.

The child device 4-5 transmits a cancel notification to the parent device 4-4 by unicast (S150). Next, the child device 4-5 cancels the stereo pair setting (S151). Specifically, the child device resets the pairing information. That is, the pair setting of the pairing information is changed to have no setting. In S151, the reproduction parameter may be restored to its own reproduction parameter before stereo setting. In this case, the reproduction parameters before stereo setting may be stored in another storage area.

On the other hand, the parent device 4-4 receives the cancel notification (S160) and cancels the stereo pair setting as described above (S161). It is not necessary to notify the child device 4-5 that has transmitted the cancel notification of the response. Accordingly, even in a case where the parent device 4-4 and the child device 4-5 are disconnected from the network and communication is impossible, it is possible to cancel the stereo pair setting of each other.

Figure 11:
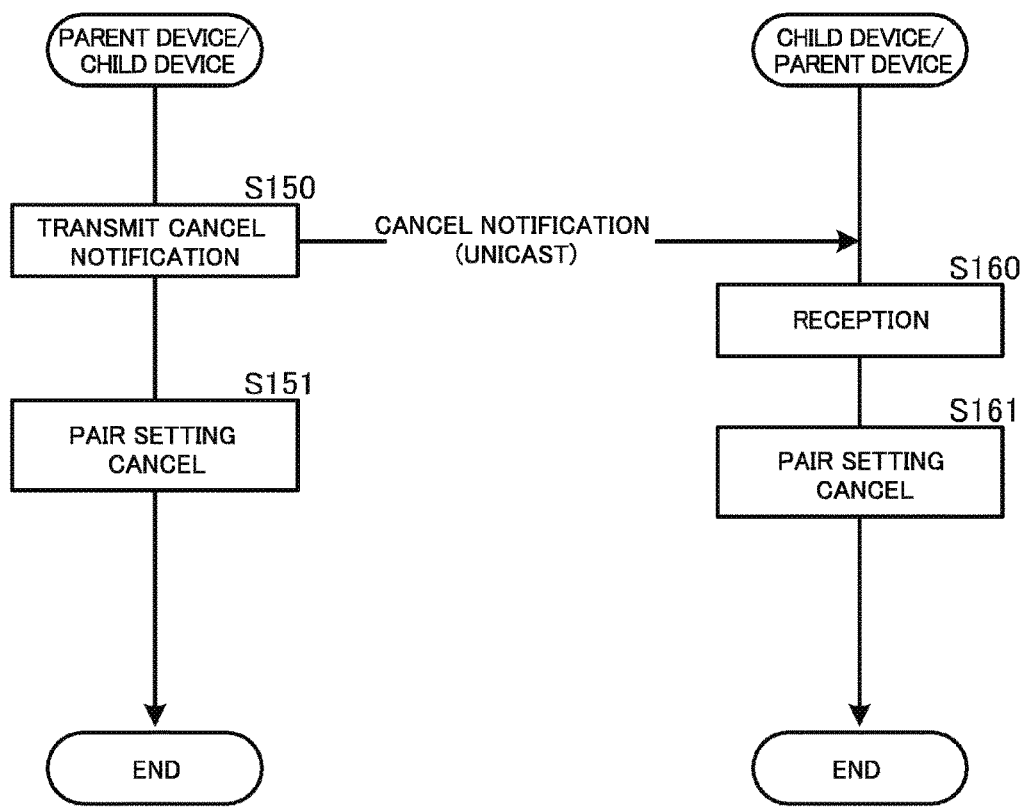
FIG. 11 is a flowchart illustrating stereo pair cancel processing executed by the control unit of the audio device.

For example, in a case where the parent device 4-4 is disconnected from the network, the parent device 4-4 cannot receive the cancel notification from the child device 4-5, but the child device 4-5 itself can cancel the setting as illustrated in FIG. 11. On the other hand, in the parent device 4-4, in a case where the user simultaneously presses the reproduction/pause button 59B and the volume up button 59C of the master device 4-4 long, the setting is canceled.

After canceling the pair setting, the audio device 4, which was the parent device, transmits the pair setting cancel information to the controller 1. The audio device 4, which is the child device, may transmit the information to the controller 1. In addition, each of the audio device 4, which is the parent device, and the audio device 4, which is the child device, may transmit the information to the controller 1. The controller 1 which has received the pair setting cancel information updates the pairing information in the audio control table based on the pair setting cancel information.

<Description of Command Transmission and Reception Procedure in Stereo Pair>

Figure 12:
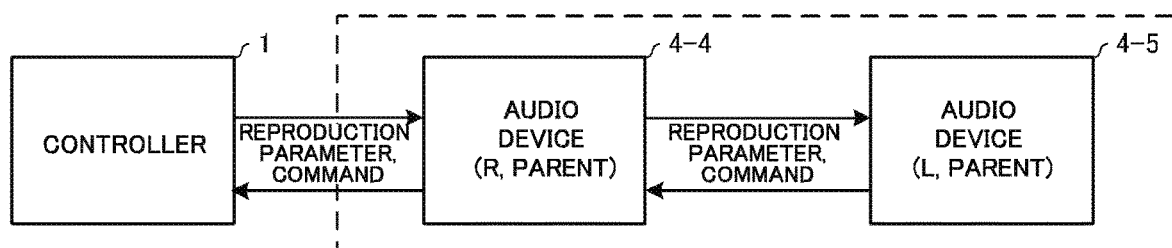
FIG. 12 is an explanatory diagram for illustrating a transmission mode of a command between audio devices set as the stereo pair.
Figure 13:
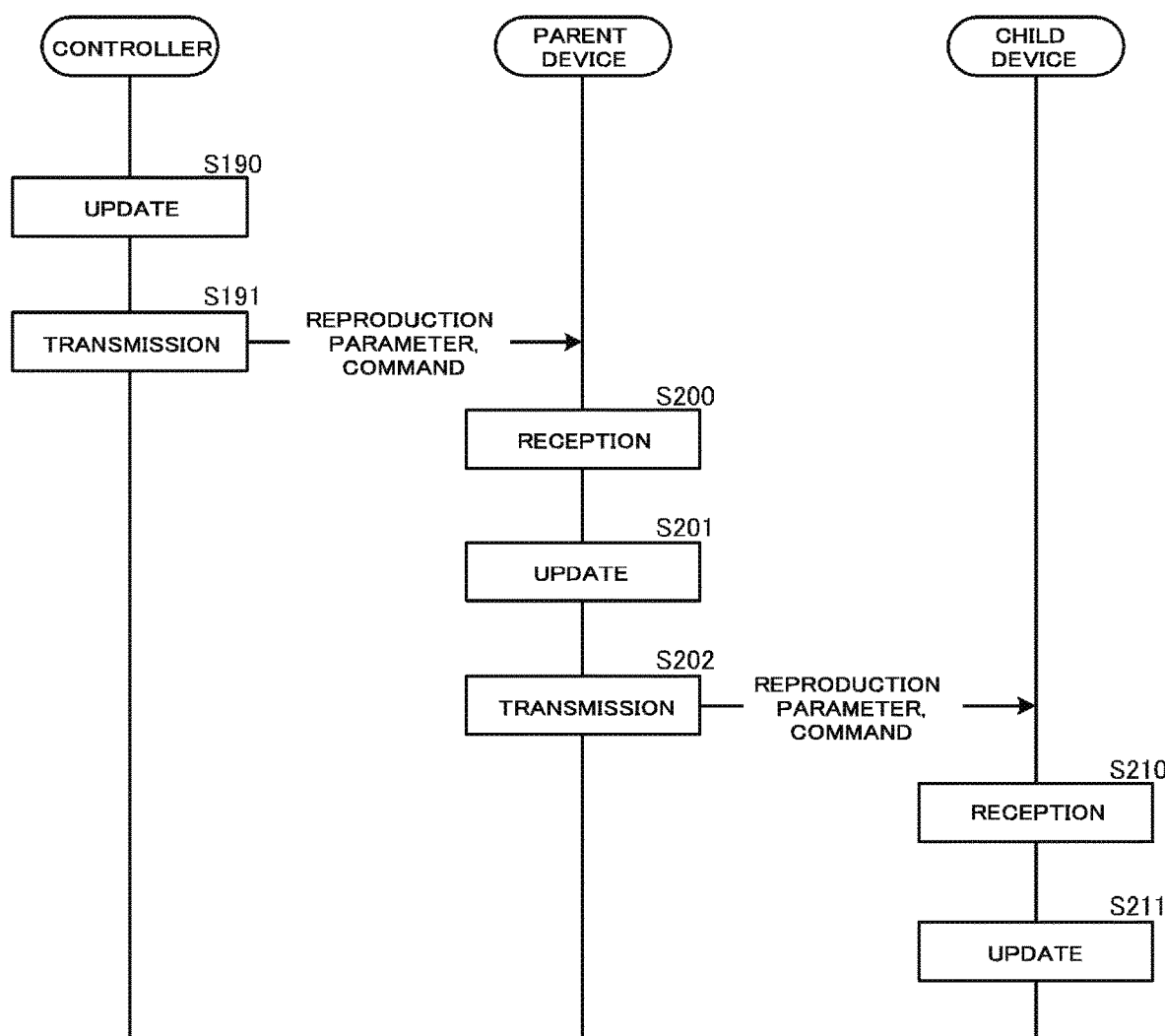
FIG. 13 is a flowchart illustrating update processing of reproduction parameter and transmission processing of a reproduction/pause command executed by the control unit of the controller.
Figure 14:
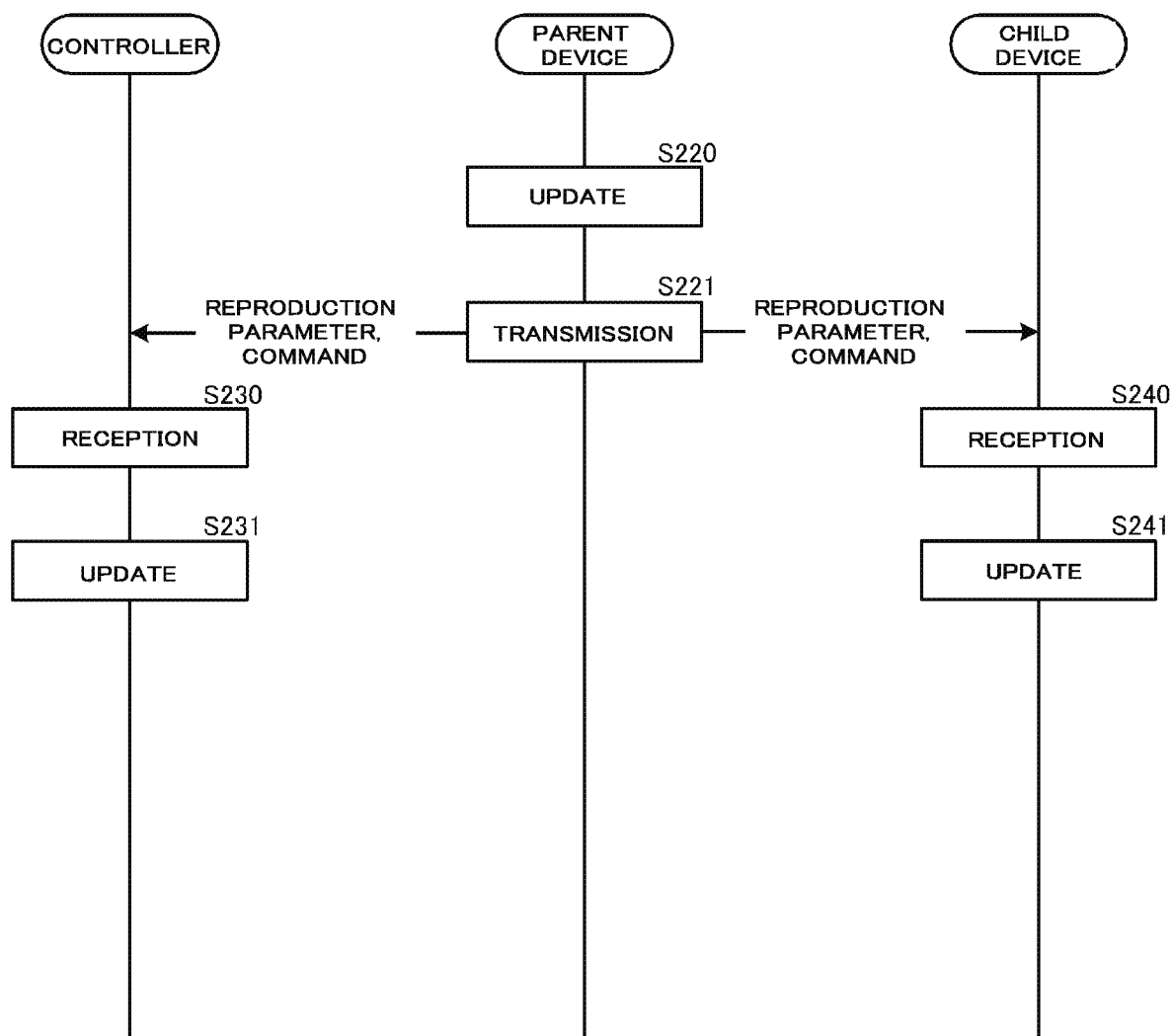
FIG. 14 is a flowchart illustrating update processing of reproduction parameter and transmission processing of a reproduction/pause command executed by the control unit of the audio device (a parent device).
Figure 15:
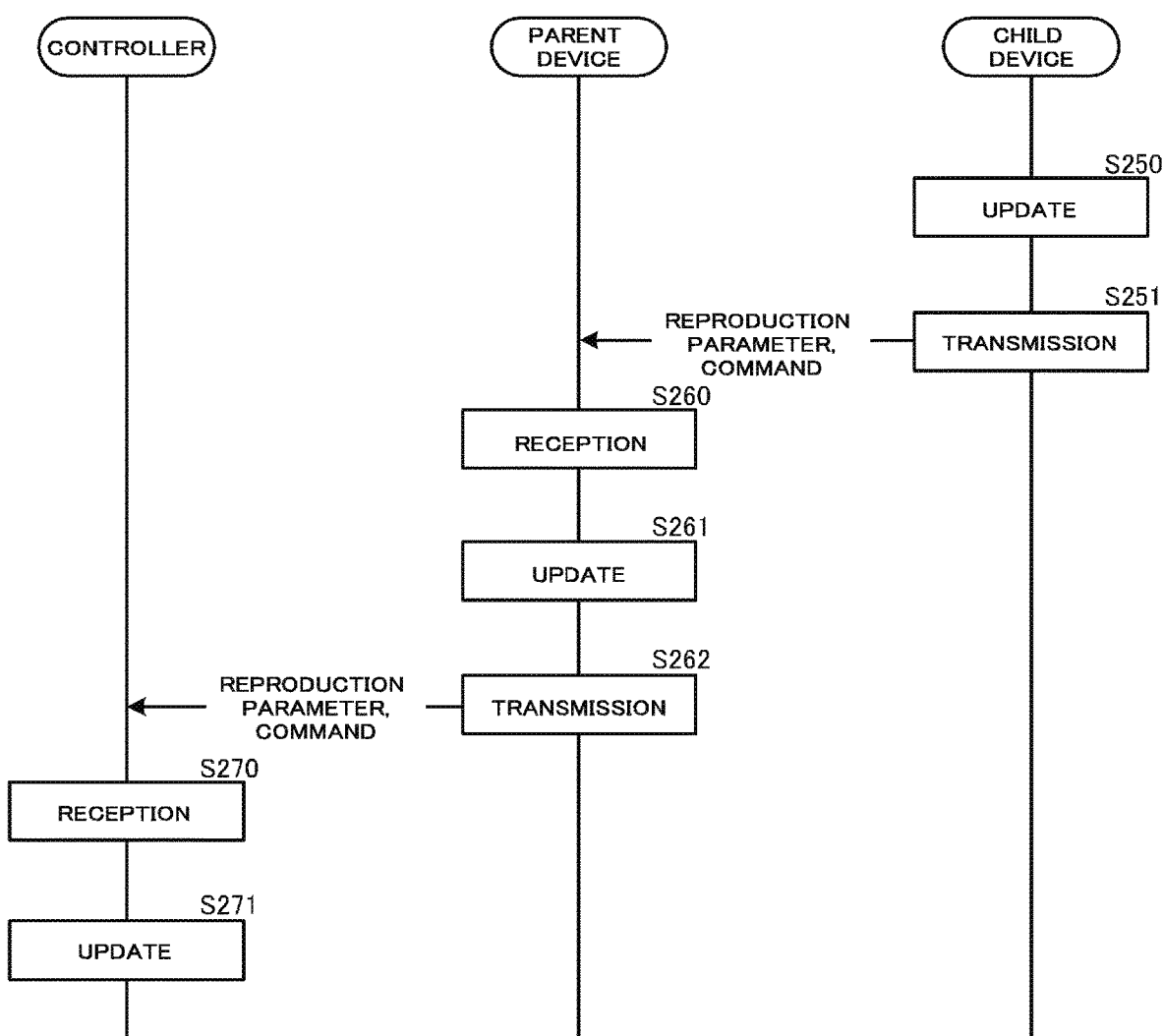
FIG. 15 is a flowchart illustrating update processing of reproduction parameter and transmission processing of a reproduction/pause command executed by the control unit of the audio device (a child device).

Next, update processing of the reproduction parameter and transmission processing of the reproduction/pause command which are executed by the audio devices 4 set as the stereo pair will be described with reference to FIG. 12 to FIG. 15. FIG. 12 is an explanatory diagram for illustrating a transmission mode of a command or the like between the audio devices 4 set as the stereo pair. FIG. 13 is a flowchart illustrating the update processing of the reproduction parameter and the transmission processing of the reproduction/pause command which are executed by the controller 1. FIG. 14 is a flowchart illustrating the update processing of the reproduction parameter and the transmission processing of the reproduction/pause command which are executed by the parent device. FIG. 15 is a flowchart illustrating update processing of the reproduction parameter and transmission processing of the reproduction/pause command which are executed by the child device.

In the present embodiment, the user can change the setting of the reproduction parameter of the audio devices 4 set as the stereo pair by operating the operation unit 59 (such as the volume up button 59C and the volume down button 59D) of the parent device or the child device set as the stereo pair, or the operation unit 30 (touch panel 30A) of the controller 1. In a case of the stereo pair, since the parent device and the child device have the same reproduction parameter, the change contents are reflected in both the reproduction parameter of the parent device and the reproduction parameter of the child device.

The reproduction/pause command is an instruction to reproduce or pause (including momentary pause) of the content. The audio device 4 which has received the reproduction/pause command starts reproduction or the like according to the command. In a case where the stereo pair is set, the reproduction/pause command is generated according to the user's operation of the operation unit 59 (reproduction/pause button 59B) of the parent device or the child device, or the operation unit 30 (touch panel 30A) of the controller 1.

The update processing of the reproduction parameter and the transmission processing of the reproduction/pause command in the present embodiment differ in processing procedure depending on whether the user's operation is performed by any one of the operation units 30 and 59 of the controller 1, the parent device, or the child device. In the controller 1, it is possible to change the setting of the reproduction parameter of each audio device 4, but the operation of updating the reproduction parameter for the child device and the reproduction/pause operation only for the child device is not received.

For example, a case where the audio device 4-4 is the parent device 4-4 and the audio device 4-5 is the child device 4-5 will be described. As described above, the parent device 4-4 and the child device 4-5 are considered as one device. Therefore, in a case where the reproduction parameter is changed by the controller 1, the updated reproduction parameter and an update command are transmitted from the controller 1 only to the parent device 4-4. Thereafter, the updated reproduction parameter and the update command are transmitted (transferred) from the parent device 4-4 to the child device 4-5. The update command is a command to instruct update of the reproduction parameter.

In a case where the reproduction parameter is changed by the parent device 4-4, the updated reproduction parameter and the update command are transmitted from the parent device 4-4 to the controller 1 and the child device 4-5, respectively. In a case where the reproduction parameter is changed by the child device 4-5, the updated reproduction parameter and the update command are transmitted from the child device 4-5 to only the parent device 4-4. Thereafter, the updated reproduction parameter and the update command are transmitted from the parent device 4-4 to the controller 1. The same applies to the reproduction/pause command or the like. Accordingly, in the present embodiment, regarding the transmission of the reproduction parameter and the command, the parent device is in charge of communication with the other devices.

Next, a case where the operation of changing the setting of the reproduction parameter of the parent device is performed on the above-described controller 1 (the operation unit 30) will be described with reference to the flowchart of FIG. 13. Similar to FIG. 12, the description will be made using the parent device 4-4 and the child device 4-5 as an example.

The controller 1 updates the reproduction parameter based on the operation information received by the operation unit 30 (S190). In this case, the reproduction parameter of the child device 4-5 is also updated with the same contents as the reproduction parameter of the parent device 4-4. Next, the controller 1 transmits the updated reproduction parameter with the update command to the parent device 4-4 (S191).

The parent device 4-4 receives the reproduction parameter and the like from the controller 1 (S200) and updates the currently stored reproduction parameter to the received reproduction parameter (S201). Next, the parent device 4-4 transmits the update command and the received reproduction parameter to the child device 4-5 (S202).

The child device 4-5 receives the reproduction parameter from the parent device 4-4 (S210) and updates the currently stored reproduction parameter to the received reproduction parameter (S211). As a result, the reproduction parameter changed on the controller 1 is synchronized with the corresponding parent device and child device.

Regarding the reproduction/pause command, similar processing is performed, and the reproduction/pause command is transmitted to the parent device and the child device. For example, in the case of a reproduction command, the reproduction status of the parent device and the child device held in the controller 1 is updated to "Now Reproducting" (S190). Further, the reproduction command is transmitted from the controller 1 to the parent device 4-4, and then the reproduction command is transmitted from the parent device 4-4 to the child device 4-5 (S191 and S202). The reproduction status information is information indicating the reproduction state of each audio device 4. The parent device 4-4 and the child device 4-5 that have received the reproduction command start stereo reproduction.

Next, a case where the operation of changing the setting of the reproduction parameter is performed using the operation unit 59 of the above-described parent device will be described with reference to the flowchart of FIG. 14. Similarly to FIG. 12, the description will be made using the parent device 4-4 and the child device 4-5 as an example. In the operation unit 59 of the parent device 4-4, only an operation input for changing the setting of its own reproduction parameter is received.

The parent device 4-4 updates the reproduction parameter based on the operation information received by the operation unit (S220). Next, the parent device 4-4 transmits the updated reproduction parameter and the update command to the controller 1 and the child device 4-5 (S221).

The controller 1 and the child device 4-5 receive the reproduction parameter and the like from the parent device 4-4 (S230 and S240) and update the currently stored reproduction parameter to the received reproduction parameter (S231 and S241). The controller 1 updates the reproduction parameter included in the various setting information items in the audio control table. As a result, the reproduction parameter changed on the parent device 4-4 is synchronized with the controller 1 and the child device 4-5.

Regarding the reproduction/pause command, similar processing is performed, and the reproduction/pause command is transmitted to the controller 1 and the child device 4-5. For example, in the case of a reproduction command, the reproduction status of the parent device and the child device is updated to "Now Reproducting" (S220), and a reproduction command is transmitted from the parent device to the child device and the controller 1 (S221). The parent device 4-4 and the child device 4-5 start stereo reproduction.

Next, a case where an operation for changing setting of reproduction parameters is performed using the operation unit 59 of the above-described child device will be described with reference to the flowchart of FIG. 15. Similarly to FIG. 12, the description will be made using the parent device 4-4 and the child device 4-5 as an example. In addition, since the child device 4-5 is set as the child device of the stereo pair, the operation input is received by the operation unit 59 of the child device 4-5 as an operation input for changing the setting of the reproduction parameter of the parent device 4-4.

The child device 4-5 updates the reproduction parameter based on the operation information received by the operation unit (S250). Next, the child device 4-5 transmits the updated reproduction parameters and the update command to the parent device 4-4 (S251).

The parent device 4-4 receives the reproduction parameter and the like from the child device 4-5 (S260) and updates the currently stored reproduction parameter to the received reproduction parameter (S261). Next, the parent device 4-4 transmits the received reproduction parameter and the update command to the controller 1 (S262).

The controller 1 receives the reproduction parameter and the like from the parent device 4-4 (S270) and updates the reproduction parameter included in the various setting information items in the currently stored audio control table to the received reproduction parameter (S271). As a result, the reproduction parameter changed on the child device 4-5 is synchronized with the parent device 4-4 and the controller 1.

Regarding the reproduction/pause command, similar processing is performed, and the reproduction/pause command is transmitted to the controller 1 and the parent device 4-4. For example, in the case of a reproduction command, the reproduction status of the parent device 4-4 and the child device 4-5 is updated to "Now Reproducting" (S250), and the reproduction command is transmitted from the child device 4-5 to the parent device 4-5 and then the reproduction command is transmitted from the parent device 4-4 to the controller 1 (S251 and S262). The parent device 4-4 and the child device 4-5 start stereo reproduction.

In addition to the reproduction/pause command, a power ON/OFF command instructing turning on and off the power of the portion functioning as the reproduction device of the audio device 4 may be transmitted in the same procedure.

<Description of Operation Procedure of Group Setting>

Next, referring to the control screen (display content of the display unit 41) of the controller 1 (mobile phone 1) in the audio system 10 illustrated in FIGS. 16 and 17, a control procedure (reproduction procedure and group setting procedure) of the audio device 4 using the controller 1 will be described. FIGS. 16(A) to 16(D) are diagrams illustrating an example of the control screen at the time of reproduction control. FIGS. 17(A) and 17(B) are diagrams illustrating an example of the control screen at the time of group setting.

When the controller 1 is activated, the control screen is displayed on the display unit 41. First, the initial menu screen of FIG. 16(A) is displayed. When the user taps a setup button 91, the touch panel 310 detects the operation and the above-described setup mode is started. In addition, similarly, when the user taps a system connection button 92, communication with the audio device 4 in the audio system 10 is started. For example, the controller 1 communicates periodically (for example, every 10 seconds) with each audio device 4 in a polling method until the controller 1 is disactivated. The controller 1 receives the information from each audio device 4.

First, the reproduction procedure for causing the audio device 4 to reproduce the audio source will be described. When communication with the audio device 4 is started, a device selection screen (the list screen) as illustrated in FIG. 16(B) is displayed on the control screen (the display unit 41) of the controller 1 (the mobile phone 1). On the device selection screen, a selection button (the device selection button) for selecting the audio device 4 is displayed. On the device selection button, the device name of the audio device 4 is displayed. The device name is displayed based on the model information of the audio control table.

In the example of FIG. 16(B), four device selection buttons 93 to 96 are displayed. The device selection button 93 is a button for selecting an AV receiver, and the audio device 4-1 is selected by this button. The device selection button 94 is a button for selecting a player A, and the audio device 4-2 is selected by this button. The device selection button 95 is a button for selecting a player B, and the audio device 4-3 is selected by this button. The device selection button 96 is a button for selecting a speaker A, and the audio device 4-4 is selected by this button. The user can select the audio device 4 by operating (tapping) any one of the device selection buttons 93 to 96. In the example of FIG. 16(B), there are four device selection buttons 93 to 96 displayed on the control screen. However, the other device selection buttons can also be displayed by scrolling the control screen by a touch operation.

When one of the device selection buttons is selected (tapped) by the user, the controller 1 displays the source selection screen of the selected audio device 4. On the source selection screen, an icon button (a source selection image) indicating a reproducible (serviceable) source of the selected audio device 4 (a source which can be reproduced by the selected audio device 4) is displayed. FIG. 16(C) illustrates the source selection screen in a case where the audio device 4-2 is selected by tapping the device selection button 94. On the source selection screen, the icon buttons 97 to 99 indicating the source which can be reproduced by the audio device 4-2 are displayed.

The icon button 97 is a button for selecting a CD. The icon button 98 is a button for selecting the net distribution by the distribution server 6. The icon button 99 is a button for selecting FM (radio). When the user selects (taps) one of the icon buttons, the selected source is reproduced.

For example, when the icon button 97 is selected in FIG. 16(C), the controller 1 transmits a command message (reproduction command) to start the reproduction of the CD to the audio device 4-2, a reproduction screen (Now Playing screen) of the CD as illustrated in FIG. 16(D) is displayed. Operation units such as a PLAY/PAUSE button and a volume slider are displayed on this screen, and the user operates these operation units to execute reproduction, pause, volume control, or the like of music (music data) of CD.

Next, a setting procedure of a group for synchronously reproducing the same source by a plurality of audio devices 4 will be described. In the group setting procedure, the audio device to be the master (master device) of the group and the audio device to be the client (client device) are selected. The group setting procedure will be described with reference to FIG. 17.

The group setting procedure is started by selecting a link (Link) button 230 illustrated in FIG. 16(B). When the link button 230 is selected, the master device selection screen (the list screen) illustrated in FIG. 17(A) is displayed. On the master device selection screen, master device selection buttons 121 to 125 for selecting a master which is a supply source of an audio signal (the audio source) synchronously reproduced in the group are displayed. On this screen, for example, when a master device selection button 121 is operated, the audio device 4-1 becomes the master of synchronous reproduction. In FIG. 17(A), for ease of understanding, only five buttons 121 to 125 are displayed as master device selection buttons. Other master device selection buttons can also be displayed by scrolling the control screen by a touch operation.

Figure 17A:
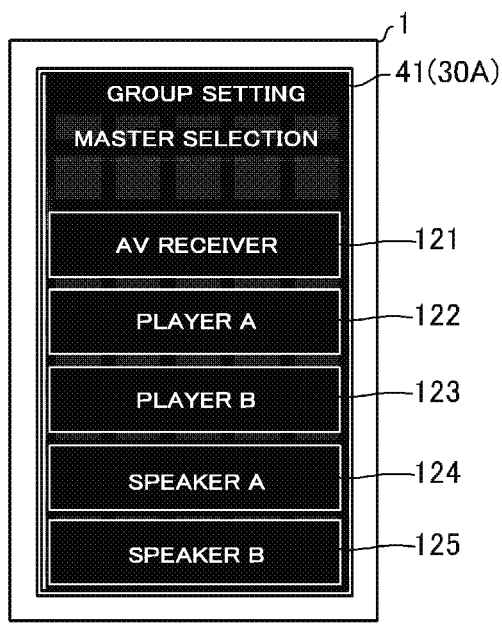
FIGS. 17A and 17B are diagrams illustrating an example of the control screens (a master selection screen and a client selection screen) displayed on the mobile phone.
Figure 17B:
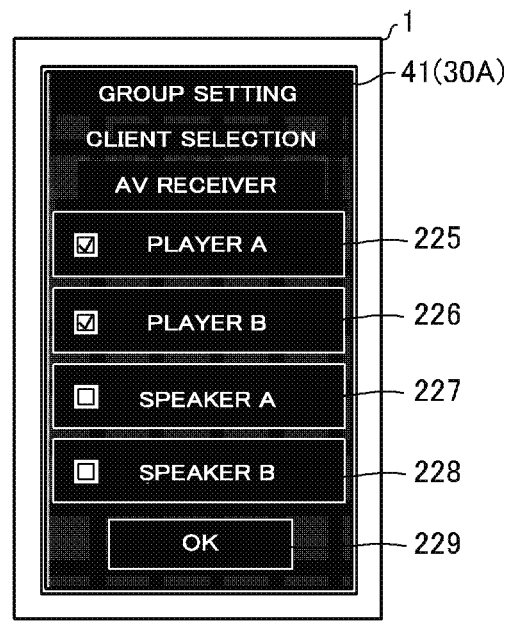

When the master is selected, the displayed screen is changed to the client device selection screen illustrated in FIG. 17(B). On the client device selection screen, client device selection buttons 225 to 228 for selecting the client of the group are displayed. When any one of the client device selection buttons 225 to 228 is tapped, a check mark is displayed in a check box in the tapped button, and the tapped button becomes the selected state. In FIG. 17(B), a state in which both the client device selection buttons 225 and 226 are tapped is illustrated. In this case, the check marks are displayed in both check boxes of the client device selection buttons 225 and 226, and the audio devices 4-2 and 4-3 become the clients. Also in FIG. 17(B), for ease of understanding, only four buttons 225 to 228 are displayed as client device selection buttons. However, other client device selection buttons can also be displayed by scrolling the control screen by a touch operation.

After the above procedure, when the user operates a determination (OK) button 229, the setting of the group is completed. The information of this group is registered in the audio control table illustrated in FIG. 5. In the audio control table illustrated in FIG. 5, the group information indicating that the audio device 4-1 is master and the audio devices 4-2 and 4-3 are the client is registered, as in the above example. When the group is set, the same audio signal (the audio source) is synchronously reproduced in the audio devices 4 belonging to the group. The audio source is reproduced by the master audio device 4, and the audio signal is distributed from the master to the audio devices 4 set as the client. Therefore, the audio source reproduced in the group is restricted to those which the master can reproduce.

After the group setting operation is completed, the displayed screen returns to the device selection screen from the client device selection screen illustrated in FIG. 17(B). When the group is set, the group setting is also reflected on the device selection screen. For example, the device selection buttons 94 and 95 corresponding to the audio devices 4-2 and 4-3 which are the clients are displayed in a state of being grayed out such that the buttons cannot be selected by the user. That is, the controller 1 refers to the group information of the audio control table and displays the device selection screen. On the other hand, the device selection button 93 corresponding to the audio device 4-1 which is the master can be selected. Accordingly, for example, in a case where the device selection button 93 is pressed, the source selection screen of the audio device 4-1 is displayed as described above, and after the source is selected, the reproduction screen is displayed. Then, with respect to the selected source, synchronous reproduction is performed by the master audio device 4-1 and the client audio devices 4-2 and 4-3.

Figure 18A:
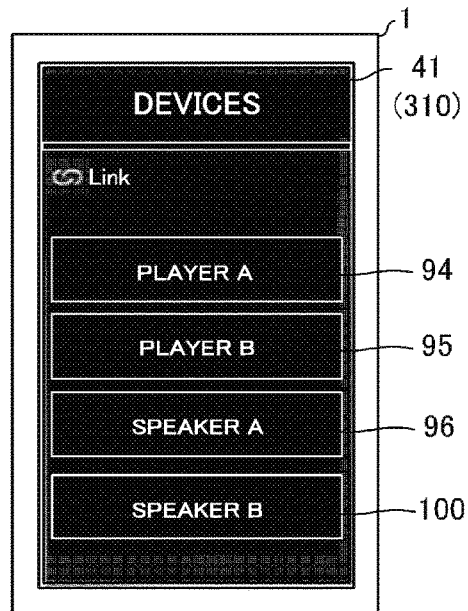
FIGS. 18A and 18B are diagrams illustrating an example of the control screen (a device selection screen) displayed on the mobile phone.
Figure 18B:
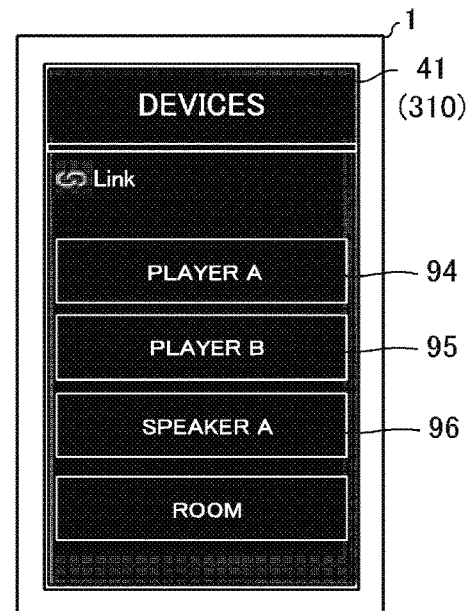

Next, with reference to FIGS. 18 and 19, the device selection screen and the group setting screen related to the audio devices 4 set as the stereo pair will be described. The display of the control screen such as the device selection screen of the controller 1 is controlled based on the audio control table including the above-mentioned pairing information. More specifically, the audio device 4 which is the child device is not displayed on the control screen so as not to be operated. FIGS. 18(A) and 18(B) are diagrams illustrating an example of the control screen (device selection screen) at the time of reproduction control before and after stereo pair setting. FIGS. 19(A) and 19(B) are diagrams illustrating an example of the control screen (master device selection screen) at the time of group setting before and after stereo pair setting.

For example, a case where the audio devices 4-4 and 4-5 which are speakers are set as the stereo pair will be described. On the device selection screen where the audio devices 4-4 and 4-5 are not set as the stereo pair, as illustrated in FIG. 18(A), the device selection buttons 96 and 100 corresponding to the audio devices 4-4 and 4-5 are displayed. Thereafter, when the stereo pair setting is performed so that the audio device 4-4 is set as the parent device and the audio device 4-5 is set as the child device, the pairing information of the audio control table is confirmed at the time of the display control. In a case where the pairing information indicates "child", the device selection button 100 corresponding to the audio device 4-5 is not displayed as illustrated in FIG. 18(B). That is, the audio devices 4-4 and 4-5 set as the stereo pair are recognized by the controller 1 as one device, and only the audio device 4-4 which is the parent device is displayed on the device selection screen.

As described in the stereo pair setting processing and the like illustrated in FIG. 10, when the stereo pair setting is performed so that the audio device 4-4 is set as the parent device and the audio device 4-5 is set as the child device, the pairing information of the audio control table is updated based on the pairing information transmitted from the audio device 4-4 (the parent device). In addition, as described in the stereo pair cancel processing illustrated in FIG. 11, the pairing information of the audio control table is updated based on the pair setting cancel information when the stereo pair setting is canceled.

Figure 19A:
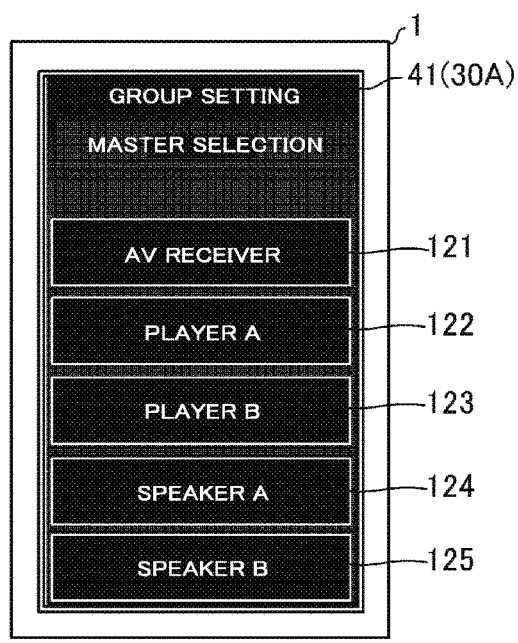
FIGS. 19A and 19B are diagrams illustrating an example of the control screen (the master selection screen) displayed on the mobile phone.
Figure 19B:
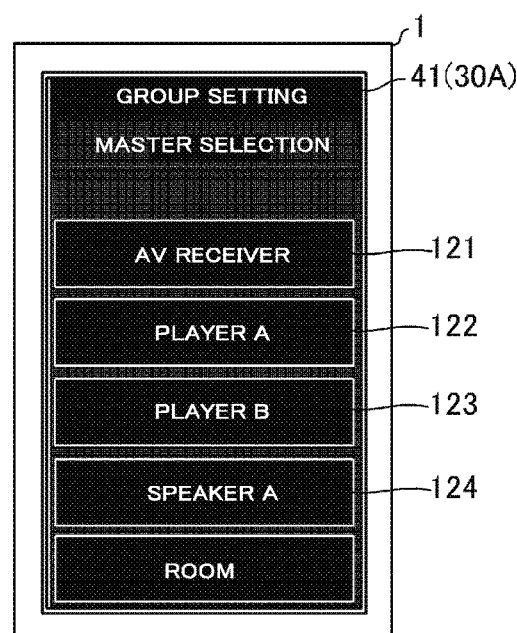

In addition, similarly, in the master device selection screen in the group setting, in the state where the stereo pair is not set, as illustrated in FIG. 19(A), master device selection buttons 124 and 125 corresponding to the audio devices 4-4 and 4-5 are displayed. Thereafter, in a case where the stereo pair setting is performed so that the audio device 4-4 is set as the parent device and the audio device 4-5 is set as the child device, the pairing information of the audio control table is confirmed at the time of the display control. In a case where the pairing information is "child", the master device selection button 125 corresponding to the audio device 4-5 is not displayed as illustrated in FIG. 19(B). The same applies to the client device selection screen. That is, the audio devices 4-4 and 4-5 set as the stereo pair are recognized by the controller 1 as one device, and only the parent device 4-4 is displayed in the selection screen in the group setting. In a case where the parent device belongs to the group as the master or the client, the child device also belongs to the group. The group information of the audio control table does not include information indicating that the child device belongs to the group. In addition, in a case where the stereo pair setting is canceled, the pairing information of the audio control table is updated as described above, so that the display of the audio device 4 which is the child device is performed again.

<Description of Operation of Controller>

Figure 20:
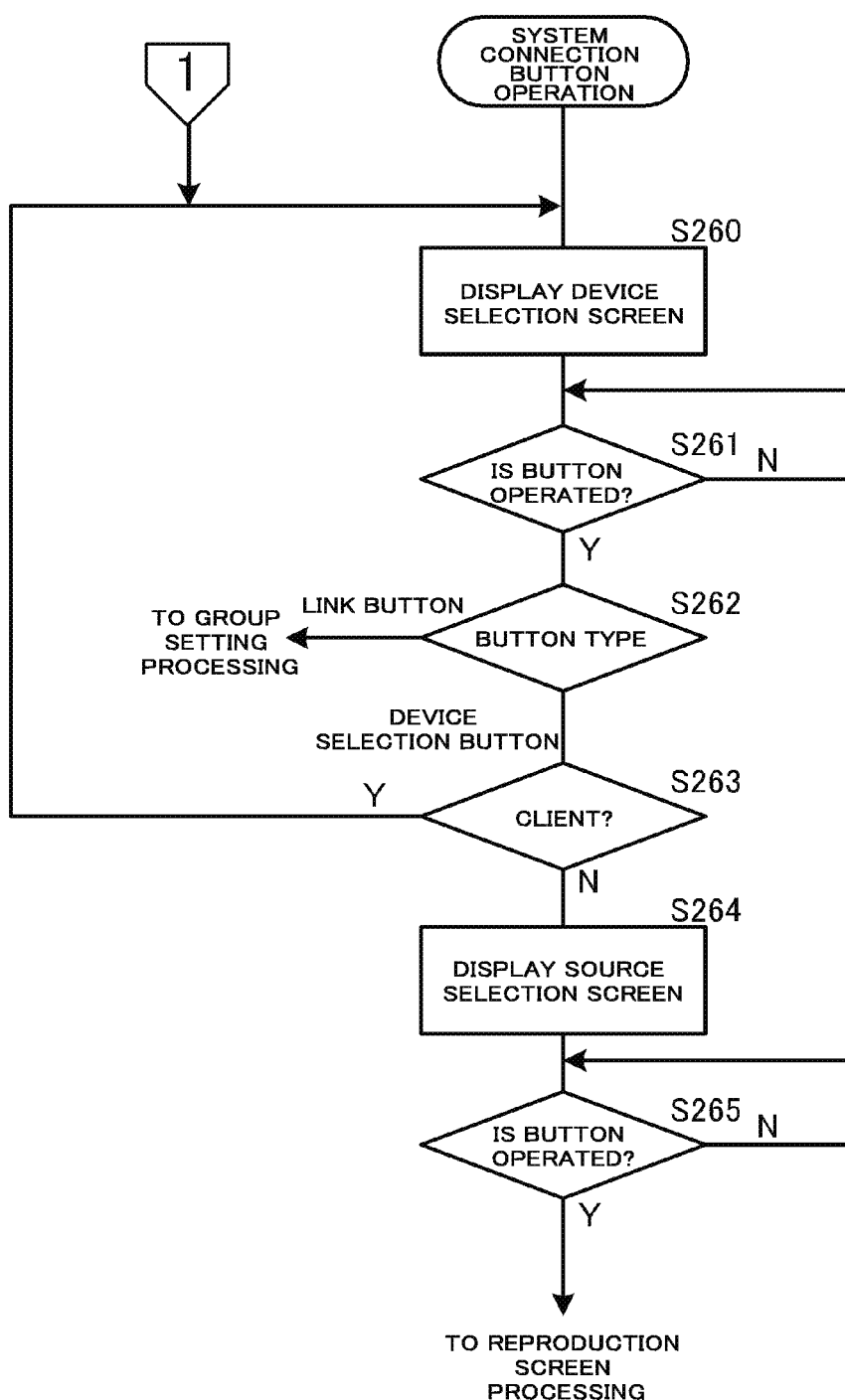
FIG. 20 is a flowchart illustrating control processing executed by a controller (the control unit).

Next, the processing operation of the controller 1 (the control unit 20) in the audio system 10 will be described with reference to FIG. 20. When the system connection button 92 is pressed by the user, this process is started. Apart of processing will not be illustrated.

First, the device selection screen as illustrated in FIG. 16(B) or the like is displayed on the display unit 41 based on the system management table, the audio control table, the room table, or the like (S260). Then, the controller 1 waits by until any one of the device selection buttons is operated on the device selection screen (S261). In this processing, the device selection button corresponding to the child device is not displayed based on the pairing information (the audio control table) as described above. When any one of the buttons is operated (YES in S261), processing corresponding to the operated button is performed (S262). In a case where the link button 230 is operated, group setting processing (see FIG. 21) is performed. In a case where any one of the device selection buttons is operated, it is determined whether the audio device 4 selected by this operation is the client (S263). This determination is performed by referring to the group information of the audio control table. In a case of the client (YES in S263), the process returns to S260.

In a case where the selected audio device 4 is not the client (NO in S263), the source selection screen of the selected audio device 4 as illustrated in FIG. 16(C) or the like is displayed on the display unit 41 (S264). Specifically, the source selection screen is displayed based on the service information of the audio control table of the selected audio device 4 or the like. The controller 1 waits until anyone of the icon buttons of the sources is operated (S265). When any one of the icon buttons is operated (YES in S265), a reproduction screen corresponding to the selected icon button (the source) as illustrated in FIG. 16(D) is displayed, and the processing on the reproduction screen progresses.

Figure 21:
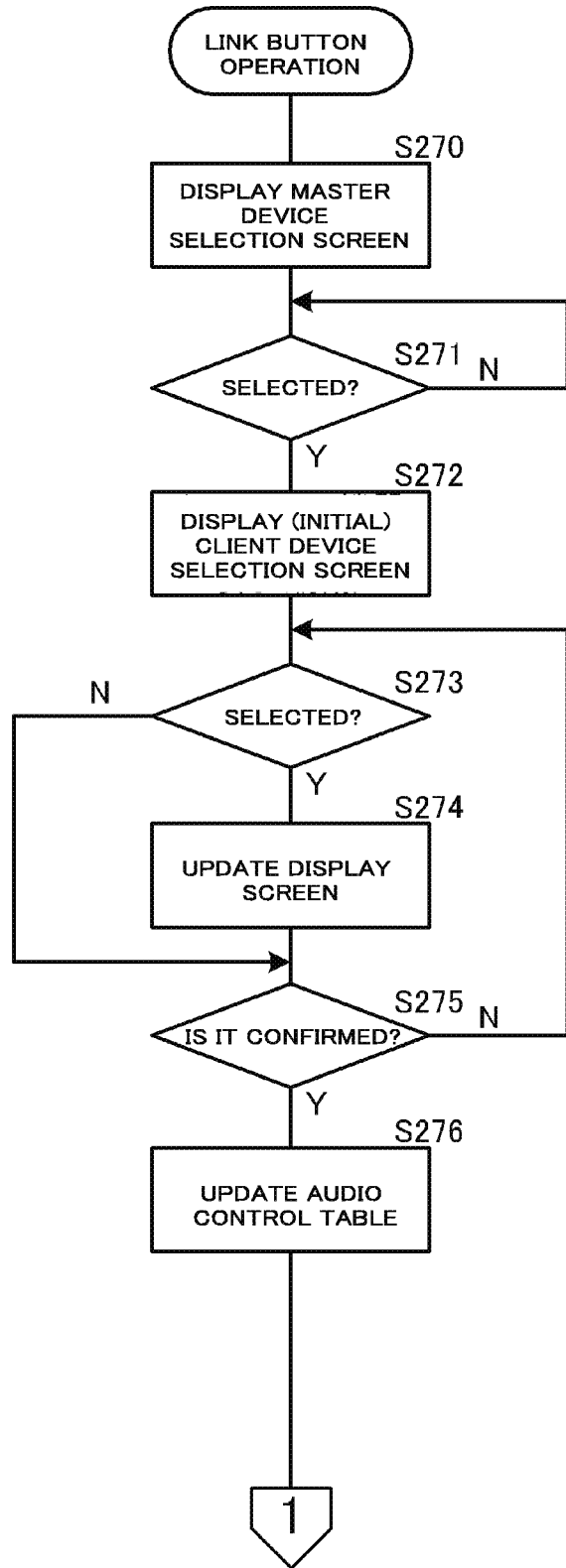
FIG. 21 is a flowchart illustrating group setting processing executed by the controller (the control unit).

Next, referring to FIG. 21, the group setting processing executed by the controller 1 in the audio system 10 will be described. FIG. 21 is a flowchart illustrating the group setting processing of the controller 1 (the control unit 20). When the link button 230 in the room selection screen is operated by the user, this process is started.

First, the master device selection screen as illustrated in FIG. 17(A) is displayed on the display unit 41 (S270), and The controller 1 waits until the master is selected (S271). When the master is selected (YES in S271), the client device selection screen corresponding to the selected master is displayed on the display unit 41, as illustrated in FIG. 17(B) (S272). At this time, the client device selection screen in the initial state in which the check mark is not displayed in the check box is displayed. Also in the master device selection screen and the client device selection screen in S270 and S272, the device selection button corresponding to the child device is not displayed based on the pairing information (the audio control table) as described above.

Then, each time when the client is selected (YES in S273), the display of the client device selection screen is updated (S274). That is, the screen is updated so as to add the check icon to the check box of the selected audio device 4. If there is a check icon in the check box of the selected audio device 4, the screen is updated so as to delete the check icon. The processing of S273 and S274 is repeatedly executed until the selection is determined (the determination button 229 is tapped) (S275). When the selection is determined (YES in S275), the audio control table is updated based on the selection result (S276).

Figure 22:
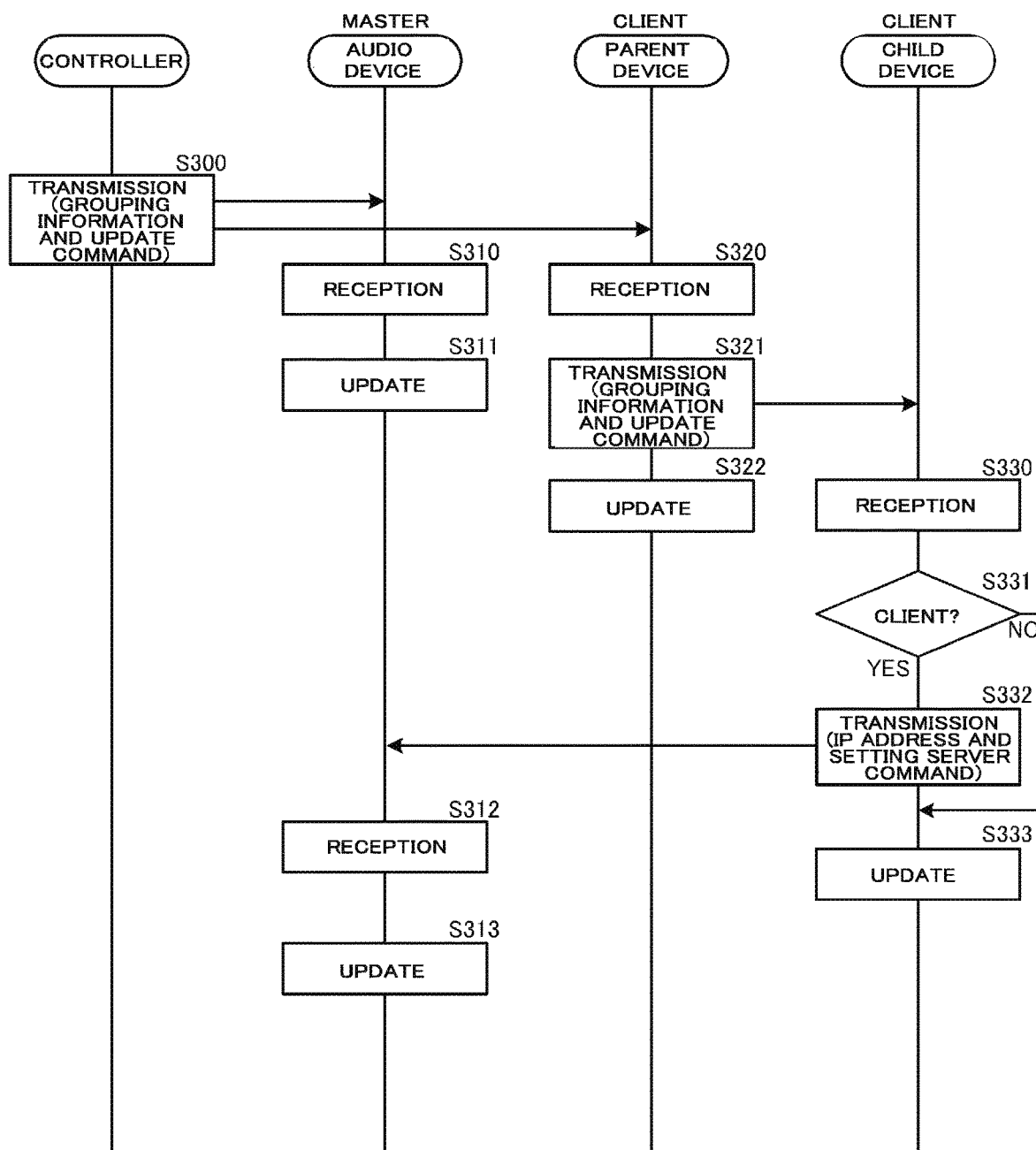
FIG. 22 is a flowchart illustrating transmitting processing of grouping information executed by the control unit of the controller.
Figure 23:
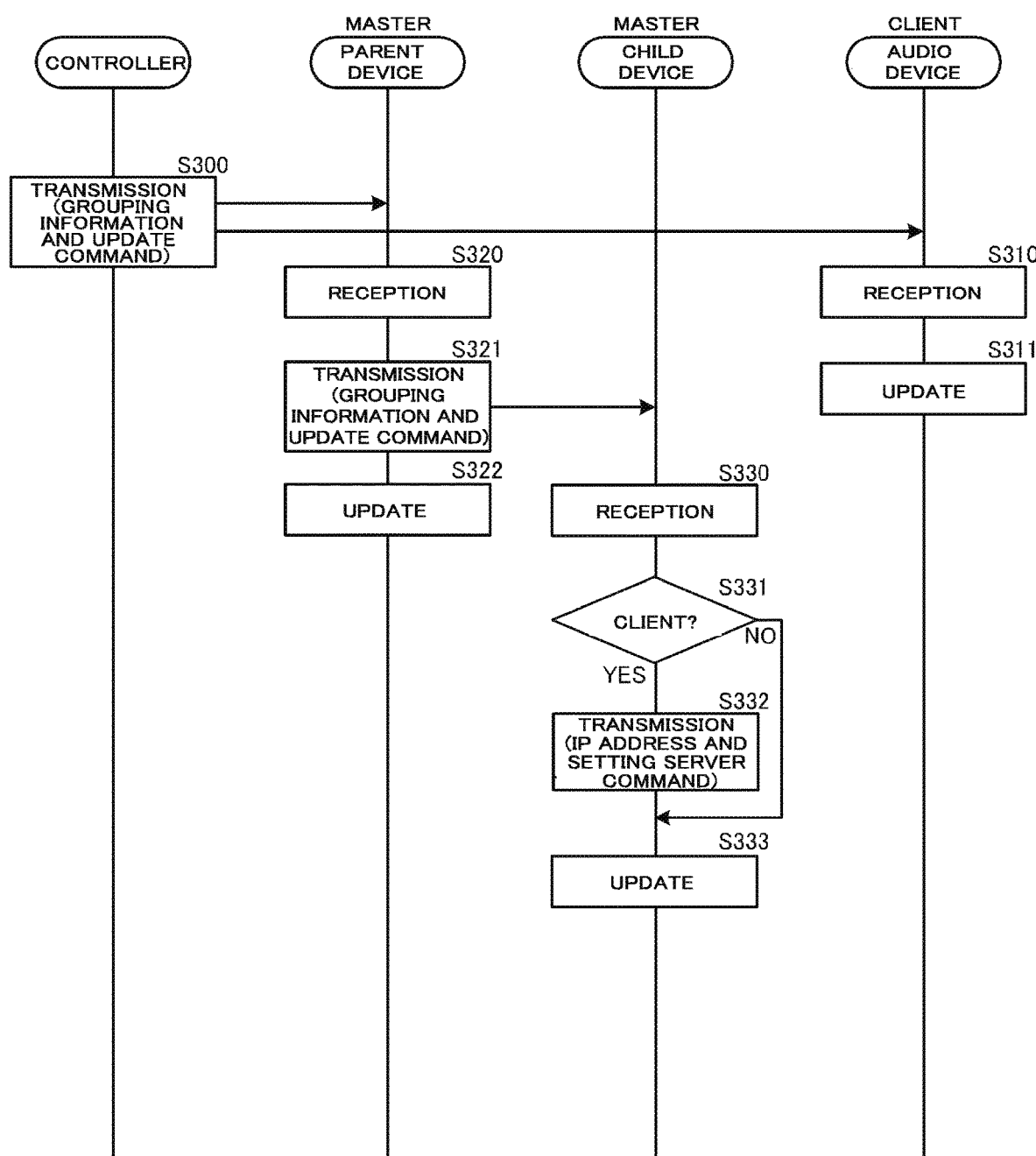
FIG. 23 is a flowchart illustrating the transmitting processing of the grouping information executed by the control unit of the controller.

Thereafter, based on the updated contents of the audio control table, the grouping information and the update command for updating the grouping information are transmitted to the master and the client. In addition, when the synchronous reproduction group to which the audio device 4 belongs is canceled, a command message for resetting the grouping information is transmitted to the audio device 4. In a case where the parent device of the stereo pair is the master or the client, the child device also belongs to the group. However, the grouping information is not transmitted from the controller 1 to the child device. As illustrated in FIGS. 22 and 23, the grouping information and the update command are transmitted from the parent device to the child device. FIGS. 22 and 23 are flowcharts illustrating a process of transmitting grouping information by the controller 1.

First, a description of transmission processing of grouping information and the update command in a case where the parent device (and the child device) is set as the client will be given with reference to FIG. 22. The controller 1 transmits the updated grouping information to the audio device 4 which is the master and the parent device which is the client (S300). The audio device 4 which is the master receives the grouping information and the like (S310) and updates its own grouping information (S311). In addition, the parent device which is the client receives the grouping information (S320) and transmits (transfers) the grouping information and the like to the child device (S321). Thereafter, the parent device updates its own grouping information (S322).

The child device receives the grouping information and the like transferred from the parent device (S330), and determines whether or not the child device itself is the client (S331). The child device determines whether the child device itself is the client based on the received grouping information. In the example illustrated in FIG. 22, since the child device is the client (YES in S331), the set server command and the IP address of the child device are transmitted to the audio device 4 which is the master (S332). Thereafter, the child device updates its own grouping information (S333). The set server command is a command for requesting the master to transmit the audio signal to the child device which is also the client of the group.

The audio device 4 which is the master receives the set server command and the like (S312) and updates the client IP addresses in the grouping information (S313). That is, the IP address of the child device is added to the client IP addresses. Accordingly, in synchronous reproduction, the child device can receive the same audio signal from the audio device 4 which is the master, as the client.

Next, transmission processing of the grouping information and update command in a case where the parent device (and the child device) is set as the client will be described with reference to FIG. 23. In the same manner as described above, the controller 1 transmits the updated grouping information or the like to the parent device which is the master and the audio device 4 which is the client (S300). The parent device which is the master receives the grouping information and the like (S320), and transmits (transfers) the grouping information and the like to the child device (S321). Thereafter, the parent device updates its own grouping information (S322).

The audio device 4 which is the client receives the grouping information and the like (S310) and updates its own grouping information (S311). Further, the child device receives the grouping information and the like transferred from the parent device (S330) and determines whether the child device itself is the client (S331). In the example illustrated in FIG. 23, since the child device is the master (NO in S331), the child device does not transmit the set server command and updates its own grouping information (S333).

In a case where the stereo pair setting is canceled while the child device belongs to a group, for example, if the child device is the client, a reset server command is transmitted to the audio device 4 which is the master, and the transmission of the synchronously reproduced audio signal may be stopped. In addition, if the child device is included in the master, there is no particular need to perform anything. This is because the audio device 4, which has been the parent device, functions as the master.

<Description of Audio Signal Distribution Mode in Group Including Stereo Pair>

Next, with reference to FIG. 24, the synchronous reproduction in the group to which the parent device and child device belong will be described. FIG. 24 is an explanatory diagram for illustrating the transmission mode of the audio signal between the audio devices 4 belonging to the group at the time of synchronous reproduction. For control of synchronous reproduction, a general technique as described in JP 2015-100085 A may be applied, and a detailed description thereof will be omitted. Further, in the present embodiment, the number of audio devices 4 belonging to one group can be set two or more.

In addition, as described above, in a case where the parent device is selected as the master, the parent device and the child device are treated as masters. In addition, in a case where the parent device is selected as the client, the parent device and the child device are treated as clients.

Figure 24A:
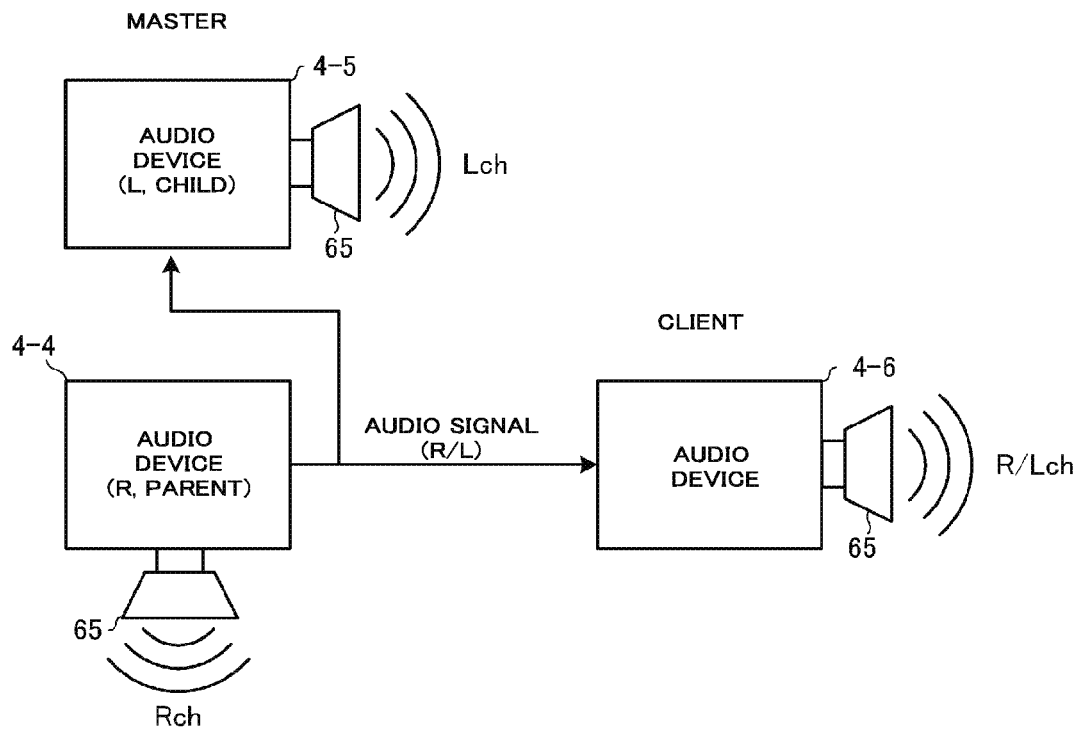
FIGS. 24A and 24B are explanatory diagrams illustrating a transmission mode of an audio signal between the audio devices belonging to the group at a time of synchronized reproduction.

First, an example of FIG. 24(A) will be described. In the group illustrated in FIG. 24(A), the parent device 4-4 and the child device 4-5 are the master, and the audio device 4-6 is the client.

The parent device 4-4 which is the master distributes the audio signal (R/L), which is the content to be synchronously reproduced, into three signals and distributes (transmits) the signal to the child device 4-5 and the audio device 4-6 which is the client from the wireless LAN communication unit 56. In addition, the parent device 4-4 separates the audio signal (R) of the Rch from the distributed one audio signal (R/L) and outputs the separated signal to the power amplifier 55 to perform output of the audio signal of the Rch.

The child device 4-5 also separates the audio signal (L) from the received audio signal (R/L) and outputs the separated signal to the power amplifier 55 to perform reproduction of the audio signal of the Lch. As a result, the stereo reproduction is performed by the parent device 4-4 and the child device 4-5. On the other hand, the audio device 4-6 outputs the received audio signal (R/L). For example, the received audio signal (R/L) is down-mixed and output (monaural output) from the audio device 4-6.

Figure 24B:
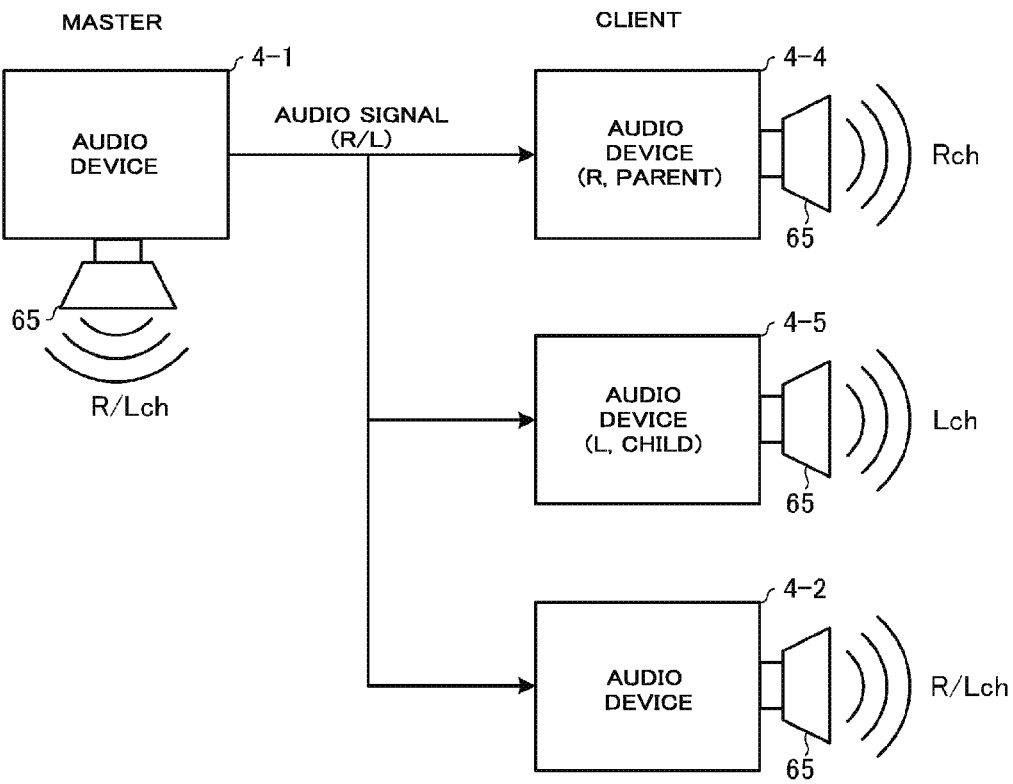

Next, an example of FIG. 24(B) will be described. In the group illustrated in FIG. 24(B), the audio device 4-1 is master, and the audio device 4-2, the parent device 4-4 and the child device 4-5 are the client.

The audio device 4-1 which is the master distributes the audio signal (R/L), which is the content to be synchronously reproduced, into four signals and distributes (transmits) the distributed signal to the audio device 4-2, the parent device 4-4, and the child device 4-5 which are the client from the wireless LAN communication unit 56. In addition, the audio device 4-1 down-mixes the distributed one audio signal (R/L), for example, and outputs (monaural output) to the power amplifier 55.

The audio device 4-2 outputs the received audio signal (R/L). Further, the parent device 4-4 and the child device 4-5 output the separated audio signals (R) and (L), respectively.

<Description of Display Contents at Occurrence of Abnormality of Audio Device>

Figure 25A:
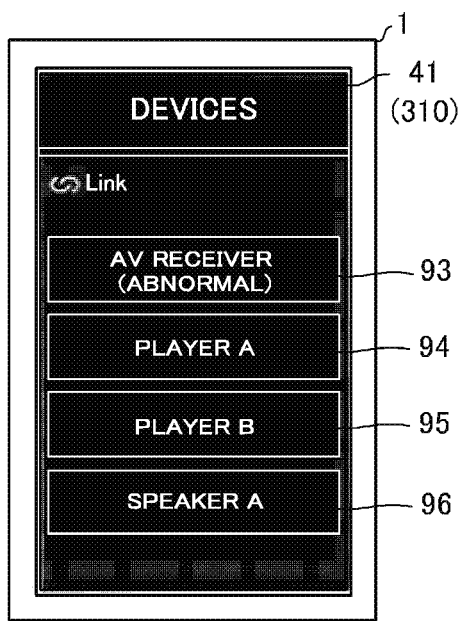
FIGS. 25A and 25B are diagrams illustrating an example of the control screen (the device selection screen) displayed on the mobile phone.
Figure 25B:
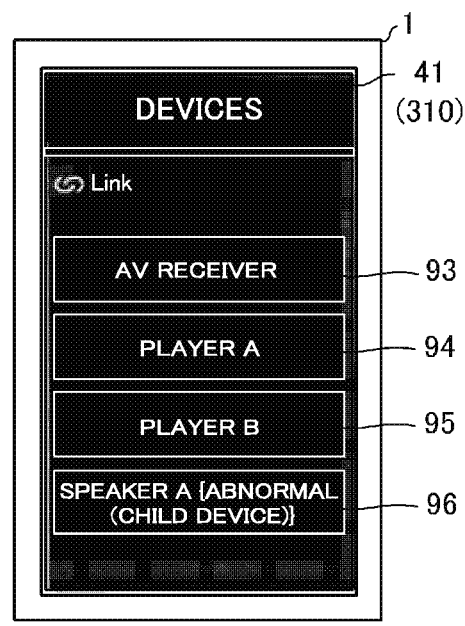

Next, referring to FIG. 25, the display of the control screen at the occurrence of an abnormality of the audio device 4 will be described. FIG. 25(A) is a diagram illustrating an example of the control screen (the device selection screen) at the time of reproduction control in a case where the audio device 4-1 is in an abnormal state. FIG. 25(B) is a diagram illustrating an example of a control screen (the device selection screen) at the time of reproduction control in a case where the audio device 4-5 which is the child device is in the abnormal state.

As illustrated in FIG. 16(B) or the like, the device name is displayed on the list screen of the audio devices 4. However, in a case where the audio device 4 is in the abnormal state, in addition to the device name, information indicating that the device is in the abnormal state is displayed.

For example, in a case where the audio device 4-1 is in the abnormal state, "(abnormal)" is displayed on the device selection button 93 in addition to "AV receiver" as illustrated in FIG. 25(A). The abnormal state includes a case where a part of functions of the audio device 4, such as the function of the reproduction processing unit of the audio device 4, do not operate normally and the case where the entire audio devices 4 do not operate.

Whether the audio device 4 is abnormal or normal is determined by the audio device 4 itself using the self-diagnosis function. In a case where it is determined that there is an abnormality, the audio device 4 transmits the information indicating that it is abnormal to the controller 1 via the communication using polling method. In a case where the entire audio device 4 does not operate, the audio device 4 cannot determine the abnormality. However, in this case, since the communication with the controller 1 is interrupted, the controller 1 may determine the abnormality. Specifically, the controller 1 determines that the audio device 4 is abnormal in a case where the communication with the audio device 4 which succeeded in communication cannot be performed for a certain period. The display mode on the master selection screen or the like may be the same.

In addition, in a case of the audio device 4 set as the stereo pair, if the parent device is in the abnormal state, information indicating that the device is in the abnormal state is displayed as described above. In addition, if the child device is in the abnormal state, information indicating that the device is in the abnormal state is displayed. However, the area to be displayed is the display area (display section) of the parent device.

For example, in a case where the audio device 4-5 which is the child device is in the abnormal state, as illustrated in FIG. 25(B), in addition to the device name "speaker A" of the parent device, "{abnormal (child device)}" is displayed on the device selection button 96 of the audio device 4-4 which is the parent device. In this case, the audio device 4-5, which is the child device, performs an abnormality determination and transmits information indicating that it is abnormal to the controller 1 via communication using polling method. Information indicating the abnormal state of the child device may be transmitted to the controller 1 via the parent device. Further, the display content of the abnormal state of the child device is not limited to "abnormal state (child device)". For example, the display content may be "abnormal state (device name)".

Although the child device is not displayed on the list screen of the audio devices 4 such as the device selection screen, since the abnormal state of the child device can be displayed in the display area (display section) of the parent device as described above, it is possible to notify the user of the abnormality of the child device.

As described above, in a case where the plurality of audio devices 4, which are set as the stereo pair of the parent device and the child device, are included in the plurality of reproduction devices (audio devices 4), the audio device 4 which is the child device is not displayed on the list screen (device selection screen or the like) of the plurality of reproduction devices, and the parent device and the child device can be recognized as one reproduction device.

<Explanatory Note>

In the above-described embodiment, regarding the parent device, the display on the device selection screen is not changed. However, the information indicating that the device is the parent device may be additionally displayed. For example, the device name of the child device may be included in the device name displayed on the device selection button of the parent device.

In addition, in the above-described embodiment, only setting of one stereo pair is performed, but a plurality of stereo pairs may be set. In addition, the stereo pair is not limited to two audio devices, and for example, four audio devices may be set as the stereo pair.

Furthermore, the above-described embodiment has a configuration in which a partner (the other audio device) to be stereo paired is searched, as illustrated in FIG. 10. However, the configuration is not particularly limited thereto. The user may manually perform the stereo pair setting such as the reproduction channel and the parent-child relationship. In addition, the stereo pair setting may be performed by the mobile phone.

Furthermore, in the above-described embodiments, all of the audio devices belonging to the audio system are described as being the object of the stereo pair setting, but the audio device which is not the of the stereo pair setting may be included.

In addition, in the above-described embodiment, the device selection screen, the master device selection screen, and the client device selection screen are described as the list screen relating to the audio device, but it is not limited thereto.

Further, in the above-described embodiments, the system management table, the audio control table, and the like are automatically generated when the audio device is connected to the network, but the configuration is not particularly limited thereto. The user may directly input the necessary information to the controller 1 or the like.

Note that the reproduction device according to one embodiment of the present invention may be an audio and visual (AV) device having a video reproduction function, and the system according to one embodiment of the present invention may include a system in which these devices coexist.

<Supplementary Note>

As understood from the description of the embodiment described above, various types of technical ideas including the invention described below are disclosed in the present specification.

A control terminal device according to one embodiment of the present invention includes a display unit and a control unit that displays a list screen of a plurality of reproduction devices on the display unit based on relationship information between the plurality of reproduction devices, receives selection of a reproduction device which is made to perform a content reproduction operation among the plurality of reproduction devices, and transmits a command to selected the reproduction device.

According to the invention, on the list screen of the plurality of reproduction devices, it is possible to perform a display in accordance with the relationship between the plurality of reproduction devices. As a result, it becomes easier to select a reproduction device which is made to perform a content reproduction operation in accordance with the relationship between the reproduction devices.

In one embodiment of the invention, a network communication unit that communicates with the plurality of reproduction devices via a network may further be included.

In one embodiment of the invention, the relationship information may include pair setting information on setting of a pair of reproduction devices.

In one embodiment of the invention, in a case where the plurality of reproduction devices includes a plurality of reproduction devices set as a stereo pair for reproducing different channels of the same content, the pair setting information may indicate the plurality of reproduction devices set as the stereo pair.

In one embodiment of the invention, the control unit may display the list screen where the plurality of reproduction devices which are set as the pair are integrated into one is displayed based on the pair setting information.

In one embodiment of the invention, one reproduction device among the plurality of reproduction devices which are set as the pair may be set as a parent device, and the other reproduction device may be set as a child device, and the control unit may not display the reproduction device that is the child device on the list screen based on the pair setting information. According to the invention, in a case where a plurality of reproduction devices include a plurality of reproduction devices set as the pair of a parent device and a child device (for example, the stereo pair), the reproduction device that is the child device is not displayed in the display of the list screen of the plurality of reproduction devices. As a result, the plurality of reproduction devices set as the pair can be recognized as one reproduction device.

In one embodiment of the invention, the control unit may transmit the command only to the parent device.

In one embodiment of the invention, in a case where a notification of an occurrence of an abnormality is received from the child device, the control unit may display an announcement of the occurrence of the abnormality in association with the display of the parent device.

In one embodiment of the invention, in a case where the notification of an occurrence of an abnormality is received from the child device, the control unit may add a display announcing the occurrence of the abnormality on a display section of the parent device.

In one embodiment of the invention, in a case where the pair setting is canceled, the control unit may cancel non-display of the reproduction device that is the child device.

In one embodiment of the invention, the control unit may cancel the non-display of the reproduction device that is the child device based on pair canceling information received from any one of reproduction devices in a state that the pair setting is canceled.

In one embodiment of the invention, the control unit may receive selection of two or more reproduction devices that synchronously reproduce the same content, and set the selected reproduction devices as a group, and the control unit may receive the selection by regarding the plurality of reproduction devices which are set as the pair as one reproduction device.

In one embodiment of the invention, the control unit may control display of the list screen based on the relationship information transmitted from the plurality of reproduction devices.

In one embodiment of the invention, the control unit may receive the selection of the reproduction device which is made to perform a content reproduction operation during the list screen is displayed.

In one embodiment of the invention, the control unit may cause the reproduction device selected as the reproduction device which is made to perform a content reproduction operation to start the content reproduction operation by transmitting the command to the reproduction device selected as the reproduction device which is made to perform the content reproduction operation selected as the object.

In one embodiment of the invention, the control terminal device may control a content reproduction of the plurality of reproduction devices. The control terminal device may further include a storage unit that stores device information of the plurality of reproduction devices, and an operation detection unit that detects an operation to an operation unit displayed on the display unit. The display unit may display information on the plurality of reproduction devices. The control unit may detect an operation of a device.

An audio system control method according to one embodiment of the present invention includes a first step of displaying a list screen of a plurality of reproduction devices on a display unit based on relationship information between the plurality of reproduction devices, a second step of receiving selection of a reproduction device which is made to perform the content reproduction operation among the plurality of reproduction devices, and a third step of transmitting a command to the selected reproduction device.

Further, an audio system control program according to one embodiment of the present invention causes a computer to function as: first means for displaying a list screen of a plurality of reproduction devices on a display unit based on relationship information between the plurality of reproduction devices, second means for receiving selection of the reproduction device which is made to perform the content reproduction operation among the plurality of reproduction devices, and third means for transmitting a command to the selected reproduction device. In addition, an information storage medium according to another embodiment of the present invention is a computer-readable information storage medium in which the audio system control program is recorded.

According to the invention, on the list screen of the plurality of reproduction devices, it is possible to perform a display in accordance with the relationship between the plurality of reproduction devices. As a result, it becomes easier to select the reproduction device which is made to perform the content reproduction operation in accordance with the relationship between the reproduction devices.

In one embodiment of the invention, a step (means) of communicating with the plurality of reproduction devices via the network may further be included.

In one embodiment of the invention, the relationship information may include pair setting information on setting of a pair of reproduction devices.

In one embodiment of the invention, in a case where the plurality of reproduction devices includes a plurality of reproduction devices which are set as a stereo pair for reproducing different channels of the same content, the pair setting information may indicate the plurality of reproduction devices which are set as the stereo pair.

In one embodiment of the invention, in the first step (the first means), the list screen where the plurality of reproduction devices which are set as the pair are integrated into one is displayed based on the pair setting information.

In one embodiment of the invention, one reproduction device of the plurality of reproduction devices which are set as the pair may be set as the parent device, and the other reproduction device may be set as the child device. In the first step (the first means), the reproduction device which is the child device may not be displayed on the list screen. According to the invention, in a case where a plurality of reproduction devices which are set as a pair of the parent device and the child device (for example, the stereo pair) are included in the plurality of reproduction devices, the reproduction device which is the child device is not displayed on the list screen of the plurality of reproduction devices, and the plurality of reproduction devices can be recognized as one reproduction device.

In one embodiment of the invention, in the third step (the third means), the command may be transmitted only to the parent device.

In one embodiment of the invention, in the first step (the first means), in a case where a notification of a occurrence of an abnormality is received from the child device, an announcement of the occurrence of the abnormality may be displayed in association with the display of the parent device.

In one embodiment of the invention, in the first step (the first means), in a case where the notification of the occurrence of the abnormality is received from the child device, a display announcing the occurrence of the abnormality may be added to a display section of the parent device.

In one embodiment of the invention, in the first step (the first means), in a case where the pair setting is canceled, the non-display of the reproduction device that is the child device may be canceled.

In one embodiment of the invention, in the first step (the first means), the non-display of the reproduction device that is the child device may be canceled based on the pair canceling information received from any one of the reproduction devices in a state that the pair setting is canceled.

In one embodiment of the invention, a fourth step (fourth means) of receiving the selection of the two or more reproduction devices which synchronously reproduce the same content and setting the selected reproduction devices as a group may further be included. In a fourth step (fourth means), the selection may received by regarding the plurality of reproduction devices which are set as the pair as one reproduction device.

In one embodiment of the invention, in the first step (the first means), the display of the list screen may be controlled based on the relationship information which is transmitted from the plurality of reproduction devices.

In one embodiment of the invention, in the second step (the second means), the selection of the reproduction device which is made to perform the content reproduction operation may be received during the list screen is displayed in the first step.

In one embodiment of the invention, in the third step (the third means), the content reproduction operation may be started in the reproduction device selected as the reproduction device which is made to perform the content reproduction operation by transmitting the command to the reproduction device which is selected as the reproduction device which is made to perform the content reproduction operation.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. An audio system control method executed by at least one processor, the audio system control method comprising:
    confirming relationship information between a plurality of reproduction devices connected via a network;
    displaying a list screen including a plurality of reproduction devices on a display unit based on the confirmed relationship information between the plurality of reproduction devices connected via the network;
    receiving selection of a reproduction device which is to be made to perform a content reproduction operation among the plurality of reproduction devices included in the displayed list screen; and
    transmitting a command to the selected reproduction device, wherein:
    in a first case where the confirmed relationship information indicates that a first reproduction device among the plurality of reproduction devices connected via the network and a second reproduction device among the plurality of reproduction devices connected via the network are not set as a stereo pair, a first list screen is displayed, the displayed first list screen including a first plurality of reproduction devices including the first reproduction device and the second reproduction device, and
    in a second case where the confirmed relationship information indicates that the first reproduction device among the plurality of reproduction devices connected via the network is set as a parent device of a stereo pair and the second reproduction device among the plurality of reproduction devices connected via the network is set as a child device of the stereo pair, a second list screen is displayed, the displayed second list screen including a second plurality of reproduction devices different from the first plurality of reproduction devices included in the displayed first list screen, the second plurality of reproduction devices including the first reproduction device, but not the second reproduction device, and a third reproduction device in place of the second reproduction device.

2. The audio system control method according to claim 1, wherein the command is transmitted only to the parent device.

3. The audio system control method according to claim 1, wherein in a case where a notification of an occurrence of an abnormality is received from the child device, an announcement of the occurrence of the abnormality is displayed in association with the display of the parent device.

4. The audio system control method according to claim 1, wherein in a case where the pair setting is canceled, non-display of the second reproduction device that was the child device is canceled.

5. The audio system control method according to claim 4, wherein the non-display of the second reproduction device that is the child device is canceled based on pair canceling information received from any one of reproduction devices among the plurality of reproduction devices connected via the network in a state that the pair setting is canceled.

6. The audio system control method according to claim 1, wherein:
    the audio system control method further comprises receiving selection of two or more reproduction devices among the plurality of reproduction devices connected via the network that are to synchronously reproduce the same content, and setting the selected two or more reproduction devices as a group, and
    the selection is received by regarding the first and second reproduction devices set as the stereo pair as one reproduction device.

7. The audio system control method according to claim 1, wherein in the second case where the first reproduction device among the plurality of reproduction devices that is set as the parent device of the stereo pair is selected to perform the content reproduction, the selection of the first reproduction device set as the parent device acts to select the second reproduction device among the plurality of reproduction devices that is set as the child device of the stereo pair to perform the content reproduction.

8. A control terminal device comprising:
    at least one processor; and
    at least one memory that stores a plurality of instructions, which when executed by the at least one processor, cause the at least one processor to:
    confirm relationship information between a plurality of reproduction devices connected via a network;

display a list screen including a plurality of reproduction devices on a display unit based on the confirmed relationship information between the plurality of reproduction devices connected via the network;

receive selection of a reproduction device which is to be made to perform a content reproduction operation among the plurality of reproduction devices included in the displayed list screen; and transmit a command to the selected reproduction device, wherein:

in a first case where the confirmed relationship information indicates that a first reproduction device among the plurality of reproduction devices connected via the network and a second reproduction device among the plurality of reproduction devices connected via the network are not set as a stereo pair, a first list screen is displayed, the displayed first list screen including a first plurality of reproduction devices including the first reproduction device and the second reproduction device, and in a second case where the confirmed relationship information indicates that the first reproduction device among the plurality of reproduction devices connected via the network is set as a parent device of a stereo pair and the second reproduction device among the plurality of reproduction devices connected via the network is set as a child device of the stereo pair, a second list screen is displayed, the displayed second list screen including a second plurality of reproduction devices different from the first plurality of reproduction devices included in the displayed first list screen, the second plurality of reproduction devices including the first reproduction device, but not the second reproduction device, and a third reproduction device in place of the second reproduction device.

9. The control terminal device according to claim 8, wherein the plurality of instructions causes the at least one processor to transmit the command only to the parent device.

10. The control terminal device according to claim 8, wherein the plurality of instructions causes the at least one processor to display, in a case where a notification of an occurrence of an abnormality is received from the child device, an announcement of the occurrence of the abnormality in association with the display of the parent device.

11. The control terminal device according to claim 8, wherein the plurality of instructions causes the at least one processor to cancel, in a case where the pair setting is canceled, non-display of the second reproduction device that was the child device.

12. The control terminal device according to claim 8, wherein:

the plurality of instructions further causes the at least one processor to receive selection of two or more reproduction devices among the plurality of reproduction devices connected via the network that are to synchronously reproduce the same content, and to set the selected two or more reproduction devices as a group, and the selection is received by regarding the first and second reproduction devices set as the stereo pair as one reproduction device.

13. The control terminal device according to claim 8, wherein in the second case where the first reproduction device among the plurality of reproduction devices that is set as the parent device of the stereo pair is selected to perform the content reproduction, the selection of the first reproduction device set as the parent device acts to select the second reproduction device among the plurality of reproduction devices that is set as the child device of the stereo pair to perform the content reproduction.

14. A non-transitory information storage medium in which an audio system control program is recorded, the audio system control program for causing a computer to:

confirm relationship information between a plurality of reproduction devices connected via a network;

display a list screen including a plurality of reproduction devices on a display unit based on the confirmed relationship information between the plurality of reproduction devices connected via the network;

receive selection of a reproduction device which is to be made to perform a content reproduction operation among the plurality of reproduction devices included in the displayed list screen; and transmit a command to the selected reproduction device, wherein:

in a first case where the confirmed relationship information indicates that a first reproduction device among the plurality of reproduction devices connected via the network and a second reproduction device among the plurality of reproduction devices connected via the network are not set as a stereo pair, a first list screen is displayed, the displayed first list screen including a first plurality of reproduction devices including the first reproduction device and the second reproduction device, and in a second case where the confirmed relationship information indicates that the first reproduction device among the plurality of reproduction devices connected via the network is set as a parent device of a stereo pair and the second reproduction device among the plurality of reproduction devices connected via the network is set as a child device of the stereo pair, a second list screen is displayed, the displayed second list screen including a second plurality of reproduction devices different from the first plurality of reproduction devices included in the displayed first list screen, the second plurality of reproduction devices including the first reproduction device, but not the second reproduction device, and a third reproduction device in place of the second reproduction device.

* * * * *